US00RE47623E

(19) United States
(12) Reissued Patent
Sepke et al.

(10) Patent Number: US RE47,623 E
(45) Date of Reissued Patent: Oct. 1, 2019

(54) VACUUM CLEANER HANDLE LOCK AND VALVE CONTROL

(71) Applicant: Midea America, Corp., Parsippany, NJ (US)

(72) Inventors: Arnold Sepke, Hudson, IL (US); Benjamin Stephens, Atlanta, GA (US)

(73) Assignee: MIDEA AMERICA, CORP., Parsippany, NJ (US)

(21) Appl. No.: 14/193,940

(22) Filed: Feb. 28, 2014

Related U.S. Patent Documents

Reissue of:
(64) Patent No.: 8,122,566
Issued: Feb. 28, 2012
Appl. No.: 12/776,750
Filed: May 10, 2010

U.S. Applications:
(63) Continuation of application No. 12/654,564, filed on Dec. 23, 2009, now Pat. No. 8,060,977.

(60) Provisional application No. 61/193,812, filed on Dec. 24, 2008.

(51) Int. Cl.
*A47L 5/32* (2006.01)
*A47L 9/32* (2006.01)
*A47L 5/36* (2006.01)

(52) U.S. Cl.
CPC ..... *A47L 5/32* (2013.01); *A47L 5/362* (2013.01); *A47L 9/325* (2013.01)

(58) Field of Classification Search
CPC ... A47L 5/32; A47L 5/362; A47L 9/02; A47L 9/248; A47L 9/325
USPC ..... 15/334, 335, 336, 337, 331, 410
See application file for complete search history.

(56) References Cited

U.S. PATENT DOCUMENTS

| | | | | |
|---|---|---|---|---|
| 1,217,817 A | | 2/1917 | Peters | |
| 1,907,644 A | * | 5/1933 | Fairfax | 15/337 |
| 2,416,418 A | * | 2/1947 | Taylor | 15/330 |
| 2,504,846 A | | 4/1950 | Kirby | |

(Continued)

FOREIGN PATENT DOCUMENTS

| | | |
|---|---|---|
| CN | 1942130 | 4/2007 |
| DE | 3429878 | 2/1986 |

(Continued)

OTHER PUBLICATIONS

First Office Action with English translation for Application No. CN200980154777.0 dated Apr. 3, 2013.

(Continued)

*Primary Examiner* — Russell D Stormer
(74) *Attorney, Agent, or Firm* — Kilpatrick Townsend & Stockton, LLP

(57) ABSTRACT

A vacuum cleaner having a base with a first air inlet, a rear housing, a removable handle and a socket on the housing to receive the handle. The handle has a grip, a second air inlet, and a hose connected to the second air inlet. The vacuum has a valve with a first inlet connected to the first air inlet, a second inlet connected to the flexible hose, a valve outlet connected to a vacuum fan, and a valve member that moves to connect the valve outlet to either inlet. The vacuum has a handle latch having one position in which it engages the removable handle to hold it in the socket and places the valve in one position, and a second position in which it releases the handle and places the valve member the other position.

32 Claims, 22 Drawing Sheets

(56) References Cited

U.S. PATENT DOCUMENTS

| | | | | |
|---|---|---|---|---|
| 2,660,457 | A | 11/1953 | Mallon | |
| 2,719,318 | A * | 10/1955 | Tschudy | 15/333 |
| 2,867,833 | A | 1/1959 | Duff | |
| 4,373,228 | A | 2/1983 | Dyson | |
| 4,376,322 | A | 3/1983 | Lockhart et al. | |
| 4,519,113 | A | 5/1985 | Hipple | |
| 4,571,772 | A | 2/1986 | Dyson | |
| 4,955,106 | A | 9/1990 | Stein et al. | |
| 5,247,720 | A * | 9/1993 | Sovis et al. | 15/334 |
| 5,477,586 | A * | 12/1995 | Jacobs et al. | 15/332 |
| 5,560,074 | A | 1/1996 | Graham et al. | |
| 5,500,979 | A | 3/1996 | Wörwag | |
| 5,617,611 | A | 4/1997 | Wörwag | |
| 5,732,439 | A * | 3/1998 | Cipolla | 15/334 |
| 5,797,162 | A | 8/1998 | Vystrcil et al. | |
| 5,815,883 | A | 10/1998 | Stein et al. | |
| 5,836,047 | A | 11/1998 | Lee et al. | |
| 6,058,559 | A | 5/2000 | Yoshimi et al. | |
| 6,295,694 | B1 | 10/2001 | Dyson et al. | |
| 6,317,920 | B1 | 11/2001 | Brickner et al. | |
| 6,442,791 | B1 | 9/2002 | McRae Thomson et al. | |
| 6,510,584 | B2 | 1/2003 | Vystrcil et al. | |
| 6,526,623 | B1 | 4/2003 | Dyson | |
| 6,572,078 | B1 | 6/2003 | Thomson et al. | |
| 7,000,288 | B2 | 2/2006 | Nighy | |
| 7,036,183 | B2 | 5/2006 | Gammack et al. | |
| 7,069,619 | B2 | 7/2006 | Bowden et al. | |
| 7,350,263 | B2 | 4/2008 | Yoshimi et al. | |
| 7,356,874 | B2 | 4/2008 | Skinner Macleod et al. | |
| 7,367,081 | B2 | 5/2008 | O'Neal | |
| 7,533,441 | B2 * | 5/2009 | Yoo | 15/331 |
| 7,555,810 | B2 | 7/2009 | Pullins et al. | |
| 7,685,648 | B2 | 3/2010 | Kenney | |
| 7,832,050 | B2 * | 11/2010 | Pullins et al. | 15/410 |
| 7,945,988 | B2 | 5/2011 | Gordon | |
| 7,979,952 | B2 | 7/2011 | Beskow et al. | |
| 8,032,982 | B2 | 10/2011 | Lee et al. | |
| 8,108,967 | B2 | 2/2012 | Wood | |
| 8,127,398 | B2 | 3/2012 | Conrad | |
| 8,205,294 | B2 | 6/2012 | Kim et al. | |
| 8,793,836 | B2 | 8/2014 | Postle et al. | |
| 2004/0135537 | A1 | 7/2004 | Conner et al. | |
| 2004/0194251 | A1 | 10/2004 | Overvaag et al. | |
| 2004/0255426 | A1 | 12/2004 | Davis et al. | |
| 2006/0026788 | A1 | 2/2006 | Fischer et al. | |
| 2006/0026789 | A1 | 2/2006 | Fischer et al. | |
| 2006/0026791 | A1 | 2/2006 | Fischer et al. | |
| 2006/0070204 | A1 | 4/2006 | Blocker et al. | |
| 2006/0070205 | A1 | 4/2006 | Fischer et al. | |
| 2006/0070206 | A1 | 4/2006 | Fischer et al. | |
| 2006/0143852 | A1 | 7/2006 | Lee et al. | |
| 2006/0179607 | A1 | 8/2006 | Ptak et al. | |
| 2006/0185115 | A1 | 8/2006 | Yoo | |
| 2006/0230572 | A1 | 10/2006 | Lee et al. | |
| 2006/0282976 | A1 | 12/2006 | Richardson et al. | |
| 2007/0028413 | A1 | 2/2007 | Fischer et al. | |
| 2007/0039121 | A1 | 2/2007 | Choi | |
| 2007/0256271 | A1 | 11/2007 | Rhea | |
| 2008/0022485 | A1 | 1/2008 | Grey | |
| 2008/0072397 | A1 | 3/2008 | Overvaag et al. | |
| 2008/0148512 | A1 | 6/2008 | Beskow et al. | |
| 2008/0282495 | A1 | 11/2008 | Battle et al. | |
| 2009/0049639 | A1 | 2/2009 | Gordon | |
| 2009/0089959 | A1 | 4/2009 | Lee et al. | |
| 2009/0089960 | A1 | 4/2009 | Lee et al. | |
| 2009/0089961 | A1 | 4/2009 | Kim et al. | |
| 2010/0017929 | A1 | 1/2010 | Kenney | |

FOREIGN PATENT DOCUMENTS

| | | |
|---|---|---|
| DE | 3716104 | 11/1988 |
| DE | 29610123 | 8/1996 |
| DE | 19525794 | 1/1997 |
| DE | 102004007031 | 9/2005 |
| EP | 0983741 | 3/2008 |
| GB | 1394497 | 5/1975 |
| GB | 1472384 | 5/1977 |
| GB | 2325399 | 11/1998 |
| JP | 03-158125 | 7/1991 |
| JP | 4-303406 | 10/1992 |
| JP | 06-178744 | 6/1994 |
| JP | 2001-070211 | 3/2001 |
| JP | 2002-233483 | 8/2002 |
| WO | WO 2008/070966 | 6/2008 |

OTHER PUBLICATIONS

International Search Report for PCT Application No. PCT/US2009/069438 dated Feb. 4, 2010.

* cited by examiner

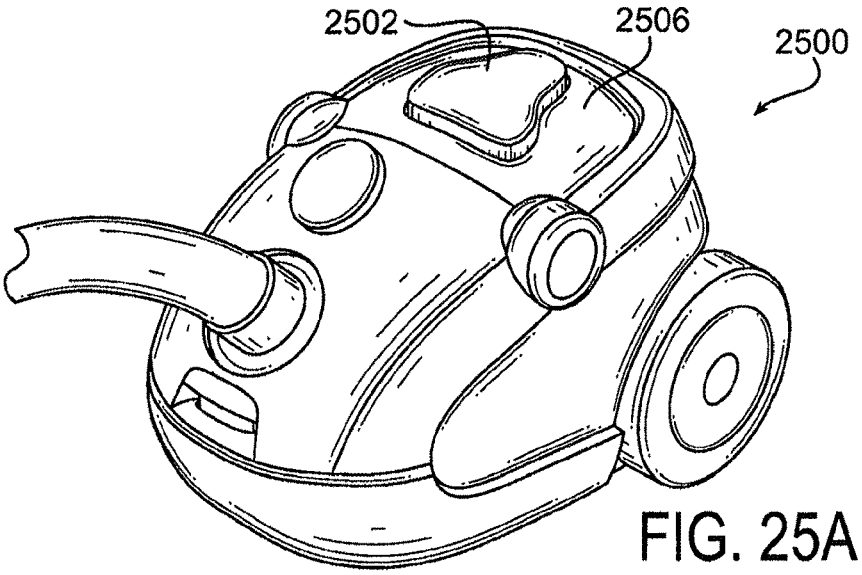
FIG. 25A
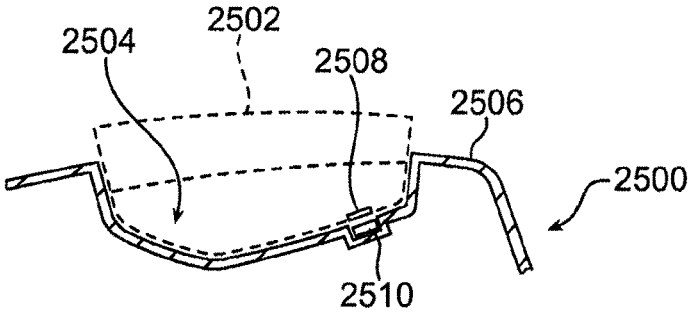
FIG. 25B
FIG. 25C
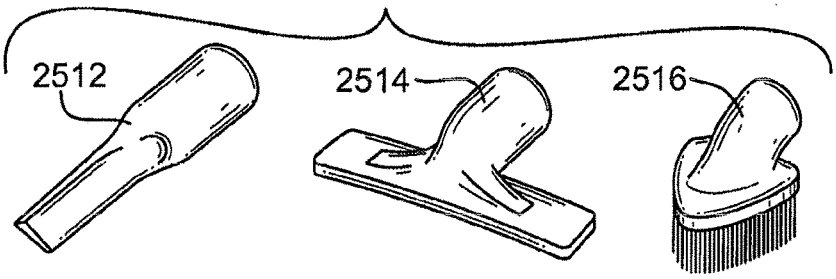

VACUUM CLEANER HANDLE LOCK AND VALVE CONTROL

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED APPLICATIONS

This application *is a reissue of U.S. Pat. No. 8,122,566, filed May 10, 2010 as U.S. patent application Ser. No. 12/776,750, which* is a continuation of U.S. patent application Ser. No. 12/654,564, filed Dec. 23, 2009, *now U.S. Pat. No. 8,060,977,* and also claims the benefit of U.S. Provisional patent application Ser. No. 61/193,812 filed on Dec. 24, 2008, the entire disclosures of the foregoing applications are hereby fully incorporated by reference.

FIELD OF THE INVENTION

The present invention relates to accessory tool features for use with vacuum cleaners, such as upright vacuum cleaners, commercial vacuums, wet extractors, stick vacuums, canister vacuums, central vacuums, and the like.

BACKGROUND OF THE INVENTION

Vacuum cleaning devices, such as upright and canister vacuum cleaners, wet extractors, stick vacuums, electric brooms and other devices, are in widespread use as tools to clean floors, upholstery, stairs, and other surfaces. Known vacuum cleaning devices have various features that are intended to improve their utility or cleaning effectiveness. For example, some vacuum cleaners include features for mounting power cords. Another feature is the provision of various types of cleaning tools. Still other features relate to vacuum cleaner motors, bag filters or cyclone separators, and air flow management systems.

While the prior art provides various features relating to cleaning effectiveness and user convenience, there still exists a need for improvement of and alternative designs for these and other features of vacuum cleaning devices.

One example of a feature that can be improved or modified relates to accessory tools used with vacuum cleaners. Many vacuum cleaners include accessory cleaning tools, such as crevice cleaning nozzles, upholstery brushes, floor cleaning tools, and powered handheld nozzles. Powered handheld nozzles typically include a rotating brush or other kind of agitator that is powered by an electric motor, a power tap from the main vacuum cleaner motor or power source, or an air turbine. Accessory tools typically are stored on the vacuum cleaner on mounts formed on or attached to the vacuum cleaner housing or, in the case of some canisters, the hose or cleaning wand. In some cases, the mount or mounts may be provided on a caddy that can be separated from the vacuum cleaner. Such mounting arrangements typically include one or more snap fitments, clamps, jaws, or other physical structures that physically resiliently lock the accessory to the vacuum cleaner. To install or remove the accessory, the user must overcome some degree of friction generated by the physical lock.

SUMMARY OF THE INVENTION

In one aspect, there is provided a vacuum cleaner having a base having a first air inlet, and a rear housing pivotally mounted to the base. The vacuum cleaner has a removable handle assembly having a grip, a second air inlet, and a flexible hose in fluid communication with the second air inlet. A socket is formed in the rear housing to selectively receive at least part of the removable handle assembly. The vacuum cleaner also has a valve assembly with a first valve inlet in fluid communication with the first air inlet, a second valve inlet in fluid communication with the flexible hose, a valve outlet in fluid communication with a vacuum fan, and a valve member adapted to move between a first valve position in which the first valve inlet is in fluid communication with the valve outlet, and a second valve position in which the second valve inlet is in fluid communication with the valve outlet. The vacuum cleaner also includes a handle latch having a first latch position in which it engages the removable handle assembly to hold it in connection with the socket and places the valve member in the first valve position, and a second latch position in which it releases the removable handle assembly to permit the removable handle assembly to be removed from the socket and places the valve member in the second position.

In another aspect, there is provided a vacuum cleaner having a base having a first air inlet and a rear housing extending from the base. The vacuum cleaner has a removable handle assembly having a grip, a second air inlet, and a flexible hose in fluid communication with the second air inlet. A socket is formed in the rear housing to selectively receive at least part of the removable handle assembly. The vacuum cleaner also has a valve assembly having a first valve inlet in fluid communication with the flexible hose, a valve outlet in fluid communication with a vacuum fan, and a valve member adapted to move between a first valve position in which the valve inlet is not in fluid communication with the valve outlet, and a second valve position in which the first valve inlet is in fluid communication with the valve outlet. The vacuum cleaner also has a handle latch having a first latch position in which it engages the removable handle assembly to hold it in connection with the socket and places the valve member in the first valve position, and a second latch position in which it releases the removable handle assembly to permit the removable handle assembly to be removed from the socket and places the valve member in the second position.

In still another aspect, there is provided a vacuum cleaner having a base having a first air inlet and a rear housing extending from the base. The vacuum cleaner has a removable handle assembly having a grip, a second air inlet, and a flexible hose in fluid communication with the second air inlet. A socket is formed in the rear housing to selectively receive at least part of the removable handle assembly. The vacuum cleaner also has a valve assembly having a valve inlet in fluid communication with the flexible hose, a valve outlet in fluid communication with a vacuum fan, and a valve member adapted to move between a first valve position in which the valve inlet is not in fluid communication with the valve outlet, and a second valve position in which the valve inlet is in fluid communication with the valve outlet. The vacuum cleaner also has a handle latch having a first latch position in which it engages the removable handle assembly to hold it in connection with the socket, and a second latch position in which it releases the removable handle assembly to permit the removable handle assembly to be removed from the socket. The vacuum cleaner has a single user interface adapted to substantially simultaneously operate the valve and the handle latch.

The foregoing aspects are provided as exemplary embodiments, and the recitations in the foregoing summary of the invention are not intended to limit the claims in any way.

BRIEF DESCRIPTION OF THE DRAWINGS

Exemplary embodiments are described in detail with reference to the examples of embodiments shown in the following figures in which like parts are designated by like reference numerals.

FIG. 25A is an isometric view of a canister vacuum cleaner having a magnetically-retained accessory tool.

FIG. 25B is a cross-section view of the accessory tool mount of the embodiment of FIG. 25A.

FIG. 25C illustrates various accessory tools that can be used in embodiments of the invention.

DETAILED DESCRIPTION OF EXEMPLARY EMBODIMENTS

The present disclosure provides numerous inventive features for vacuum cleaners. A number of these features and alternative embodiments of the invention are described with reference to their exemplary use in an upright vacuum cleaner, such as the vacuum cleaner 100 shown in FIG. 1. It will be appreciated, however, that the features described herein can be used in various other contexts. For example, the various features described herein can be used with canister vacuums, stick vacuums, portable and handheld vacuums, shop vacuums, wet extractors, central vacuum systems, and so on. Furthermore, the various features described herein may be used separately from one another or in any suitable combination. The present disclosure illustrating the use of the various inventions described herein is not intended to limit the inventions in any way.

Figure 1:
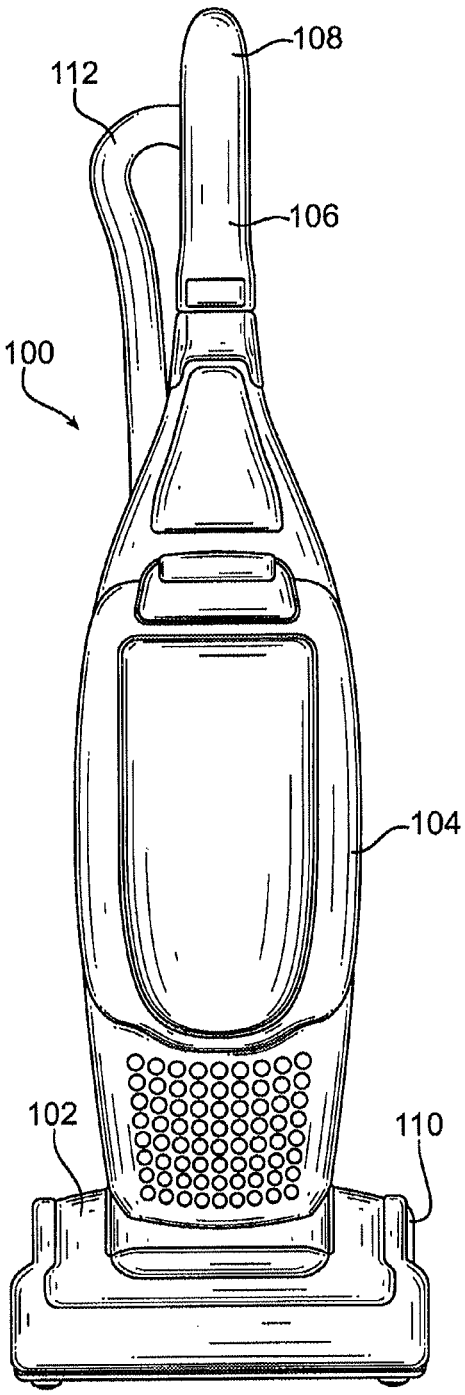
FIG. 1 is a front perspective view of an exemplary embodiment of an upright vacuum cleaner of the present invention.
Figure 2:
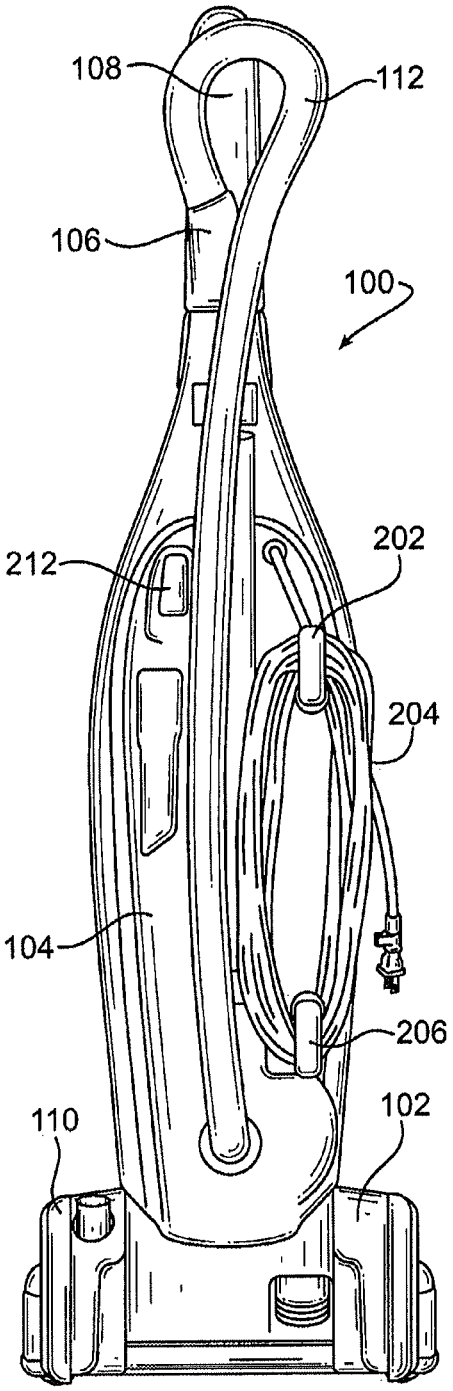
FIG. 2 is a rear perspective view of the exemplary vacuum cleaner of FIG. 1.

As shown in FIGS. 1 and 2, the exemplary vacuum cleaner 100 comprises a base 102 to which a rear housing 104 is pivotally mounted. A handle 106 extends upwardly from the rear housing 104 and terminates at a grip 108 that is adapted to be held by an operator to guide the vacuum cleaner 100 during use. In an exemplary embodiment, a hose 112 may extend from the base 102 to the handle 112. The hose 112 may comprise a rigid tube, or more preferably be flexible. Of course, it may be located on the front or side of the housing 104 instead. The hose [122] *112* may be coupled with a valve assembly, such as the valves described elsewhere herein or as known in the art, provided in the flow path, and having at least two operating positions. Examples of a hose 112 and a valve assembly are described in more detail below.

Figure 3:
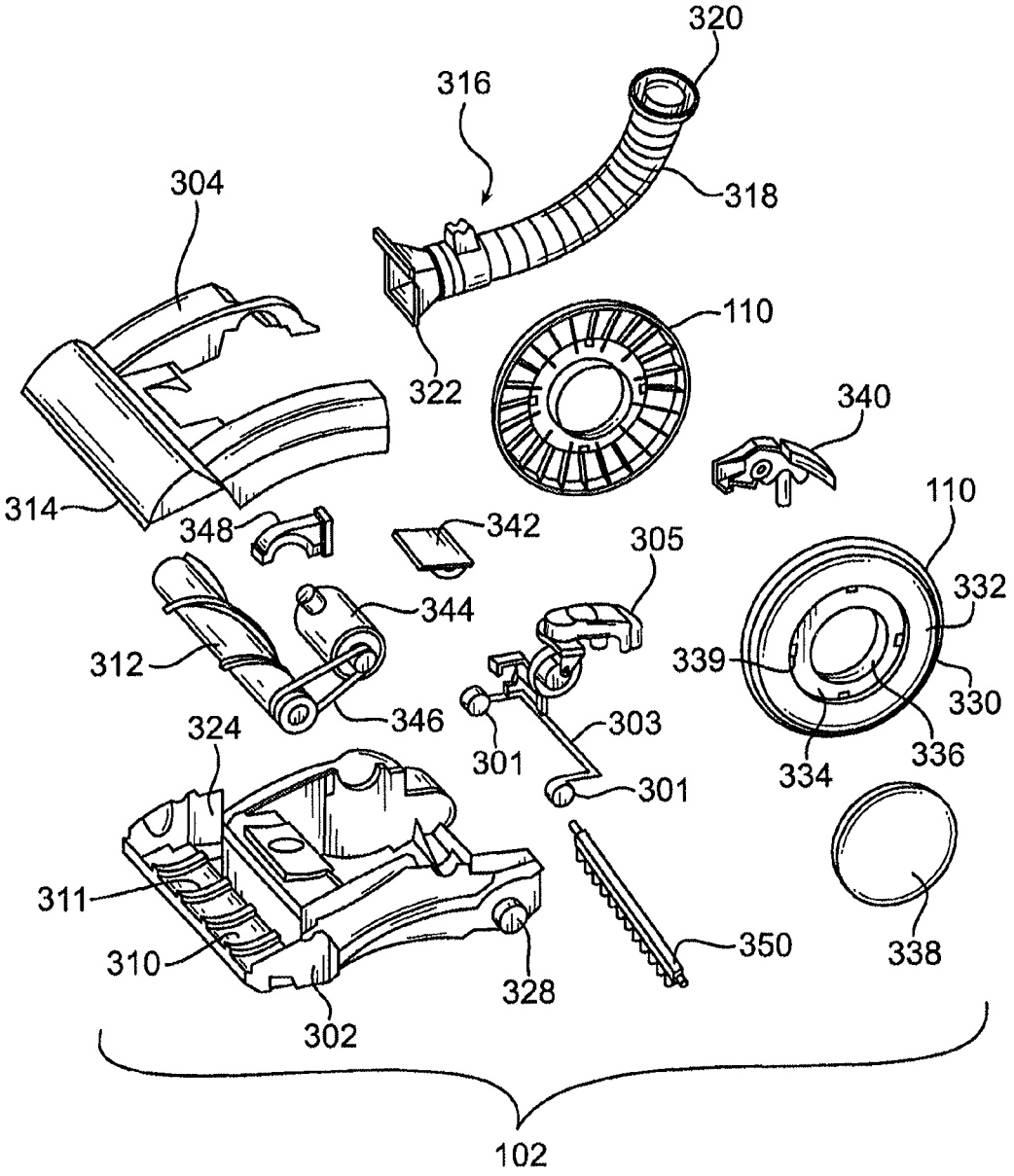
FIG. 3 is an exploded and fragmented view of the base of the exemplary vacuum cleaner of FIG. 1.

In the exemplary embodiment, the base 102 is supported at the rear by a pair of rear wheels 110, and at the front by front wheels 301 (FIG. 3). In one embodiment, the two front wheels 301 may be replaced by a single wheel or more than two wheels. If desired, the front or rear wheels 301, 110 may be mounted to the base 102 such that they can be elevated or lowered, to thereby regulate how the base 102 addresses or moves on the surface being cleaned. In a preferred embodiment, the front wheels 301 may be mounted on a movable carriage 303, which may be moved vertically by a height control 305, as is known in the art. Of course, alternative height adjustment mechanisms may be provided, or this feature may be omitted altogether.

Figure 4:
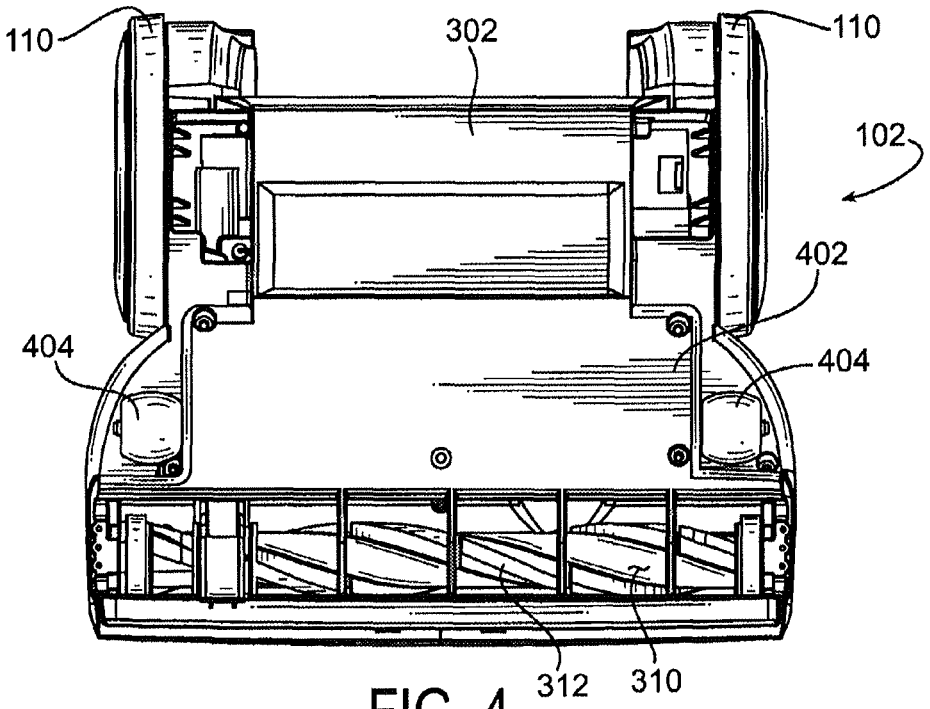
FIG. 4 is a bottom view of the base of the exemplary vacuum cleaner of FIG. 1.

As shown in FIG. 3, the base 102 includes a downwardly-facing floor inlet nozzle 310 that is positioned to address a surface over which the base 102 moves. The inlet nozzle 310 may also act as a primary suction inlet for the vacuum cleaner 100 under normal operation. The inlet nozzle 310 may be laterally elongated, and may include a brushroll 312, with spirally mounted agitators, or another agitating device disposed therein. Brushrolls and other agitators are known in the art. The base 102 may have a sole plate 402 (FIG. 4), in which the inlet nozzle 310 may be formed, and which may help hold the brushroll 312 in place. If desired, the sole plate 402 may be fabricated from a smooth material, such as stainless steel, magnesium or hard plastic, to help the base 102 glide over the surface being cleaned without snagging such surfaces or scratching them. In such an embodiment, the large surface of the sole plate 402 may cause the sole plate 402 to rise as it encounters carpets with thick piles to automatically regulate the height of the brushroll 312 and inlet nozzle 310. In this embodiment, wheels 404 may still be provided to hold the inlet 310 slightly above uncarpeted surfaces and carpets having a low pile height. These wheels 404 may or may not be adjustable to change their vertical height with respect to the inlet nozzle 310.

Figure 5:
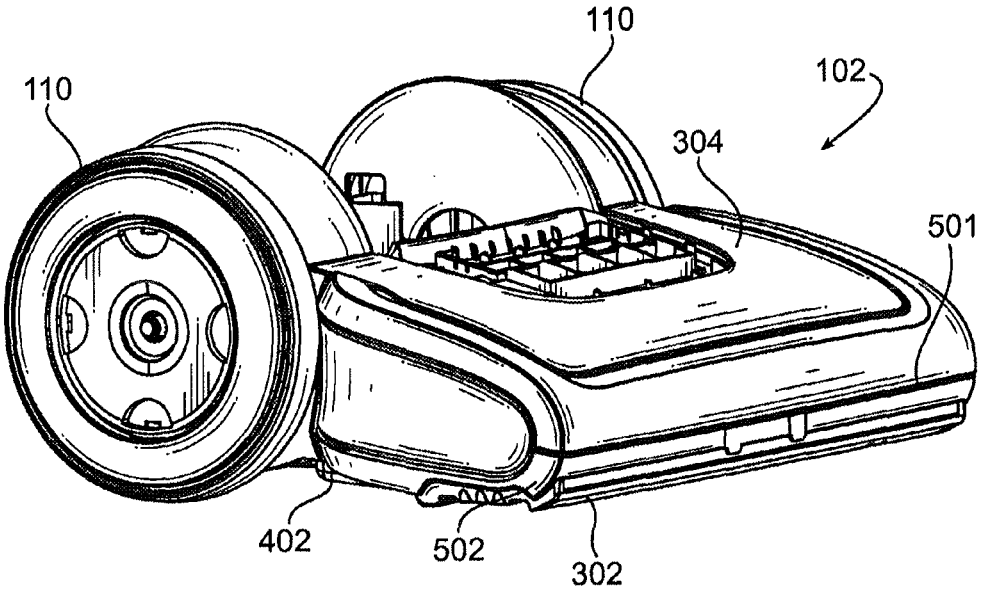
FIG. 5 is a side perspective view of the base of the exemplary vacuum cleaner of FIG. 1.

The exemplary base 102 may comprise a multi-part structure having a frame 302 and one or more covers. In an exemplary embodiment, a front cover 304 is provided to overlie the top of the frame 302. The frame 302 and cover 304 may include other functional features, such as a bumper to protect furniture and walls, windows to view into the base 102, a headlight (which may instead be provided on the rear housing 104), and the like. Referring to FIG. 5, the cover 304 may be provided or fitted with a front furniture guard 501 made of flexible plastic or rubber. The frame 302 can also be provided with a base furniture guard 502, which may line the outer perimeter and front edge of the sole plate 402. The front and base furniture guards 501, 502 may seal together when the front cover 304 is mounted onto or combined with the base frame 302. In such an embodiment, the front and base furniture guards 501, 502 may be installed to the cover 304 and frame 302, respectively, before the cover 304 and frame 302 are assembled together, which may ease assembly.

Referring back to FIG. 3, the inlet nozzle 310 may be formed in the underside of the frame 302 as part of a brushroll chamber 314 that contains the brushroll 312. The inlet nozzle 302 may comprise one or more open panes 311 through which the agitators of the brushroll 312 may protrude to contact the surface being cleaned. The brushroll 312 may be mounted in any suitable way, such as by a bearing at each end, and may have a brushroll thru-shaft (not shown) to join the bearings to help keep them aligned or provide other benefits. In an exemplary embodiment, the brushroll chamber 314 is fluidly connected to the vacuum source, such as a fan and motor, by a base hose assembly 316. The base hose assembly 316 may comprise a flexible hose 318 having a connector 320 at its distal end (the end remote from the base 102, when assembled), and an inlet nozzle adapter 322 at its proximal end. When the vacuum cleaner 100 is assembled, the flexible hose 318 extends to the rear housing 104 and attaches to a floor inlet of a valve assembly, such as explained below. The inlet nozzle adapter 322 comprises a generally square flange (although other shapes may be used) that slides into a corresponding slot 324 in the base frame 302 to hold it in place. The cover 304 may capture the inlet nozzle adapter 322 in place, or it may be secured by other means.

The rear wheels 110 may be mounted to opposite sides of the base 102 by any conventional mechanism, such as individual stub axles that are mounted in a cantilevered manner into the base frame 302. Such stub axles are known in the art. The wheels 110 may alternatively be mounted by a single axle that extends across the full width of the base 102. The axle may be any suitable shape—a straight axle, or a U-shaped structure—to allow the rear housing 104 to pivot downwardly and rearwardly with respect to the base 102. The axle 326 may be mounted to the base 102 in any suitable way. Alternatively, two mounting brackets may be provided, each having a flange to receive a wheel via a snap fitment and support the wheel via a bearing surface axle. Any kind of front or rear wheel 301, 110 may be used to allow the vacuum cleaner 100 to be pushed over a surface being cleaned. In an exemplary embodiment, each rear wheel 110 comprises a floor contacting surface 330, a sidewall 332, a hubcap depression 334, and a generally cylindrical inner flange 336. The rear wheel 110 may further comprises a hubcap 338, which is removably secured to the hubcap depression 330 to form smooth outer appearance. The hubcap 338 is preferably attached by resilient tabs (not shown) and corresponding slots 339 in the hubcap depression 334, but any other suitable attachment may be used.

Still referring to FIG. 3, the base 102 may include various other features, such as a rear handle release mechanism 340, a control board 342, a brushroll motor 344, a drive belt 346 and drive belt cover 348, and a bristle strip 350. The rear handle release mechanism 340 is positioned where a user can press it with his foot to release a pivot lock between the base 102 and rear housing 104, as is known in the art. The control board 342 may be provided in the base 102 and have a display or lights, such as colored LED lights, to indicate to a user when filters—e.g., pre-motor and/or exhaust filters—need to be changed. The control board 342 may also incorporate a motor status light, among other features. The lights may be visible to the user through one or more openings through the base 102 or may project onto the surface being cleaned to inform the user of the device's status. The brushroll motor 344 is mounted in the base 102 and drives the brushroll 312 through the drive belt 346 or other mechanism. The brushroll motor 344 may be mounted by simple fasteners, straps, or any other suitable mechanism. An exemplary brushroll motor 344 may be mounted in the base frame 302 beneath a brushroll motor cover. An electric switch (not shown) may be provided to automatically deenergize the brushroll motor 344 whenever the rear housing 104 is elevated to the full upright position, which may be useful to help prevent the brushroll 312 from damaging carpets or other surfaces. In an exemplary embodiment, the drive belt 346 may be a poly v-belt, which is a relatively flexible belt with one or more ribs on one side that mate with the sheave grooves of a similar shape on a portion of the brushroll 312 or a fitting connected thereto. The poly v-belt may provide advantages such as the use of smaller, less costly sheaves, smoother, vibration free performance, high speed capability, space-saving compact design, higher efficiency than conventional v-belts, and serpentine drive capability. The bristle strip 350 may be provided and configured to drop down to contact the surface being cleaned when the vacuum 100 is operated at the lowest level setting. The bristle strip 350 may improve cleaning during bare floor cleaning, and it may be pivotally located in front of or behind the inlet nozzle 310, or both. The base 102 also includes features for mounting the base 102 to the rear housing 104, and such features are well known in the art.

It will be understood, of course, that the foregoing base arrangement may be modified or altered in any number of ways, and various parts may be omitted or added in other embodiments of the invention. For example, in one alternative, the brushroll motor 344 may be omitted, and the drive belt 346 may be adapted to be driven by a shaft protruding from a vacuum fan motor, as known in the art. As another example, the brushroll motor 344 may be mounted within the brushroll 312 itself. These and other variations will be apparent to those of ordinary skill in the art.

Figure 6:
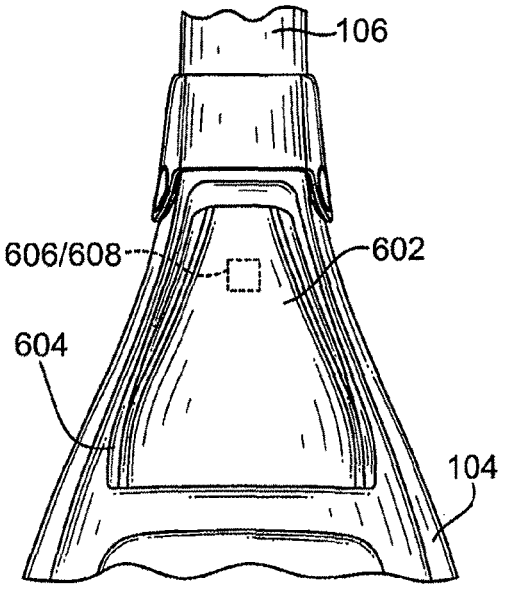
FIG. 6 is a front view of an upper region of the exemplary vacuum cleaner of FIG. 1.
Figure 7:
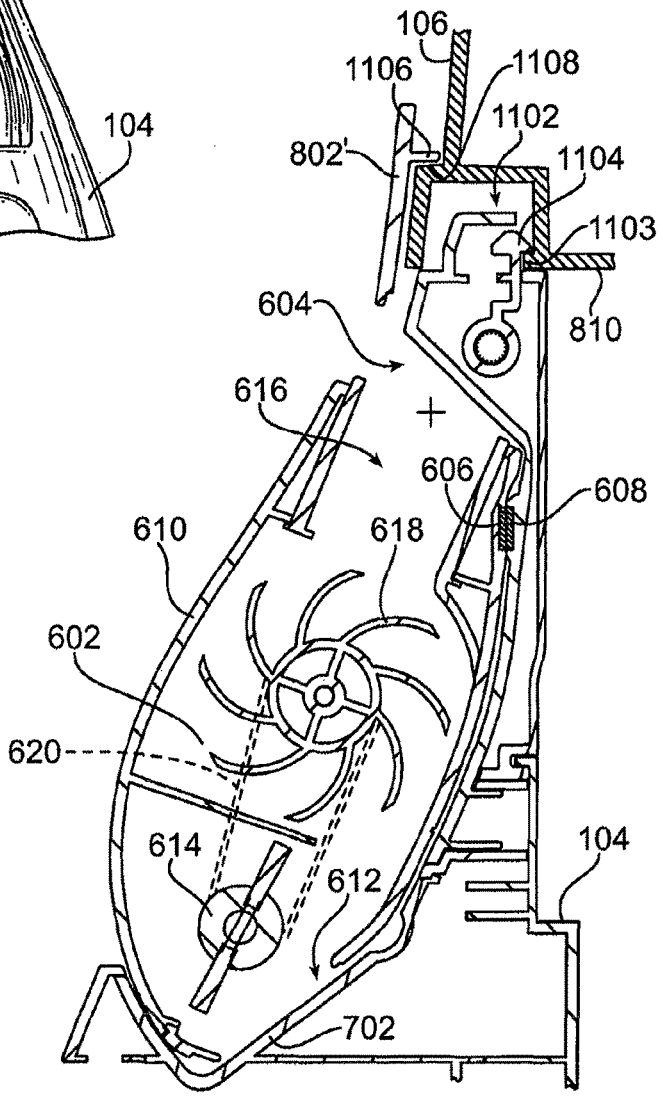
FIG. 7 is a cutaway side view of an upper region of the exemplary vacuum cleaner of FIG. 1.

Referring now to FIGS. 6 and 7, an exemplary embodiment of rear housing 104 is shown having an optional accessory tool 602. This particular type of accessory tool 602 is commonly referred to as a turbo tool. It includes a housing 610 having an inlet 612 at one end, and a rotatable brush 614 inside the housing 610 and adjacent the inlet 612. An air outlet 616 is provided at the other end of the housing 610, and configured to be selectively connected to a vacuum hose or wand to place it in communication with the vacuum's cleaning air path. A turbine 618 is rotatably mounted in the air passage between the inlet 612 and the outlet 616, and a drive belt 620 connects the turbine to the brush 614, as well-known in the art. When air flows through the tool 602, the air rotates the turbine 618, and thereby drives the brush 614.

Typical accessory tool mounting arrangements (for turbo tools and other kinds of tool), use some form of snap fitment to physically grip the tool by frictional engagement between the tool and one or more structures on the vacuum cleaner housing. While such snap fitments are functional and useful, the amount of force necessary to engage and disengage the snap fitment can vary from product to product due to manufacturing tolerance variations, wear on the parts, temperature, dirt accumulation, and other factors. New products might need to be "broken in," and customers may find that their new product is more difficult to use than a well-used sample on a showroom floor. Older products may lose some of all of their snap fitment capabilities, leading to frequent tool loss. In one aspect, exemplary embodiments may address these difficulties by using a magnetic attachment—in addition to or in lieu of snap fitment—between the tool and the housing.

In an exemplary embodiment, the accessory tool 602 is located at the top of the rear housing 104 on its front face, below where the handle 106 connects to the rear housing 104, but this mounting location is optional and other locations may be used. The accessory tool 602 is sized and shaped to fit within a corresponding recess 604 formed in the rear housing 104. As shown in FIG. 7, the recess 604 may have a cupped lower mount 702 that is shaped to retain the lower end of the tool 602. The lower mount 702 preferably does not include any structures that frictionally engage the tool 602 by snap fitment, so that the lower mount 702 holds the bottom of the tool 602 simply by gravity. The top of the accessory tool 602 can be secured to the rear housing 104 by one or more magnet features 606 that attract to one or more additional magnet features 608 in the housing 104 to secure the accessory tool 602 in the recess 604. The one or more magnet features 606 may be on the tool's 602 rear or side surface, or both, and positioned to align with one or more corresponding magnet features 608 located within the recess 604. In the shown embodiment, the magnet features 606, 608 are mounted in respective pockets on the tool 602 and housing 104 so that they are approximately flush with the tool 602 and housing 104 surfaces. Alternatively, one or both of the magnet features 606, 608 may be mounted under the surfaces so that they are not visible from the outside.

The magnet features 606, 608 may comprise any combination of magnets and magnetically-attractive materials. For purposes of this disclosure, materials that exhibit a magnetic force are referred to as "magnets" and materials that do not normally exhibit magnetic force, but are attracted to magnets, are referred to as "paramagnets." In the foregoing embodiment, at least one of the magnet features 606, 608 comprises a magnet, and the other magnet feature 606, 608 may be a magnet or a paramagnet. Typical paramagnets include common metals, such as iron, and various other known paramagnetic substances. Magnets may comprise any suitable magnetic material, as are well known in the art, such as those made using iron, ceramics, rare earth materials (e.g., samarium-cobalt or neodymium-iron-boron (a.k.a., NIB)). Electromagnets also may be used. In the shown embodiment, both magnet features 606, 608 comprise magnets that are oriented to attract to one another. If it is expected that the tool 602 may be used near magnetic or paramagnetic particles or debris (e.g., metal shavings) it may be desirable to make the tool's magnet feature 606 from a paramagnetic material so that it does not attract such debris during use.

In the foregoing embodiment, the tool 602 is held at the lower end in the lower receptacle 702 by gravity, and at the upper end by magnetic attraction between the magnet features 606, 608. The accessory tool 602 may be installed in the rear housing 104 by resting a front portion of the tool 602 into a corresponding lower portion 702 of the recess 604 and moving the accessory tool 602 into the recess 604 to engage the magnets or other fitment system. Preferably, no conventional snap fitment features are provided, so that the tool 602 is not frictionally engaged with the housing 104. However, in other embodiments, one or more snap fitment may be added to assist with retaining the tool 602 in place. For example, as an alternative or addition to a magnetic fitment system, the accessory tool 602 could be provided with one or more openings located on its rear face to be secured over one or more pairs of snap fingers (not shown) located within the recesses. Alternatively, the tool 602 may be hung on one or more hooks and pivoted into place or simply slid into a suitably shaped slot or hole in the rear housing 104.

While not necessary in all embodiments, the recess 604 may be provided on the front of the rear housing 104 so that the gravity does not tend to pull the tool 602 against the force generated by the magnet features 606, 608. In alternative embodiments, the lower mount 702 may comprise something other than the illustrated pocket. For example, the mount 702 may comprise an open platform having a detent that holds a corresponding protrusion on the tool 602, or it may comprise a post or protrusion that fits into a corresponding opening or detent on the tool 602. In addition, it is not required to form the recess 604 as a pocket into which the tool 602 fits or partially fits. Rather, the recess 604 may be omitted and replaced simply by a lower mount 702 to hold the bottom of the tool 602 and a magnet 608 to hold the top of the tool. It will also be appreciated that the lower mount 702 may be omitted, such that the tool 602 is held to the housing 104 solely by magnetic attraction between one or more pairs of magnetic features 606, 608.

The accessory tool 602 may comprise any conventional accessory tool for a vacuum cleaner, such as a crevice tool, upholstery brush, duster, or floor brush. In an exemplary embodiment, the accessory tool 602 comprises what is known as a turbo tool, as mentioned above, which is an accessory tool that uses a turbine that is operated by the suction air flow from the vacuum cleaner 100 to drive a brushroll located in the tool. The turbine can use clean air drawn from above the surface being cleaned, or dirty air drawn from the surface itself, and such devices are generally known in the art.

Another exemplary embodiment is shown in FIGS. 25A-C. In this embodiment, the vacuum cleaner comprises a canister vacuum 2500. An accessory tool 2502, such as a turbo tool, floor sweeper, bristle brush 2516, upholstery tool 2514 or crevice tool 2512, is mounted to the vacuum 2500 in a recess 2504 on the upper or side surface of the vacuum housing 2506. A first magnet feature 2508 provided on the tool 2502, is located to magnetically attract to a second magnet feature 2510 in the recess 2504 (or elsewhere on the housing 2506). The tool 2502 preferably is mounted without snap fitment, but some snap fitting features may be provided in other embodiments. It will be appreciated that other arrangements in other kinds of vacuum cleaners also may be used.

Figure 9:
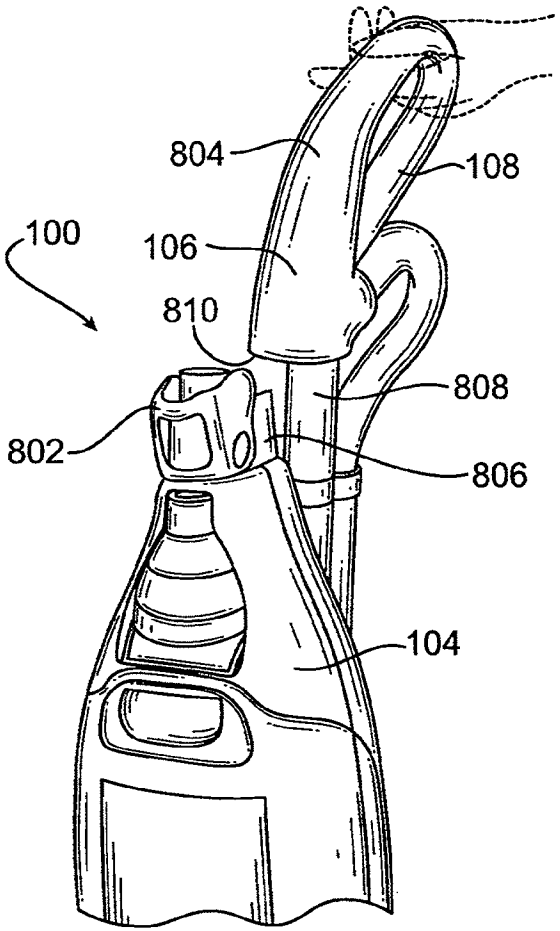
FIG. 9 is a front perspective view of an upper region of the exemplary vacuum cleaner of FIG. 1 shown in a second assembly condition.
Figure 8:
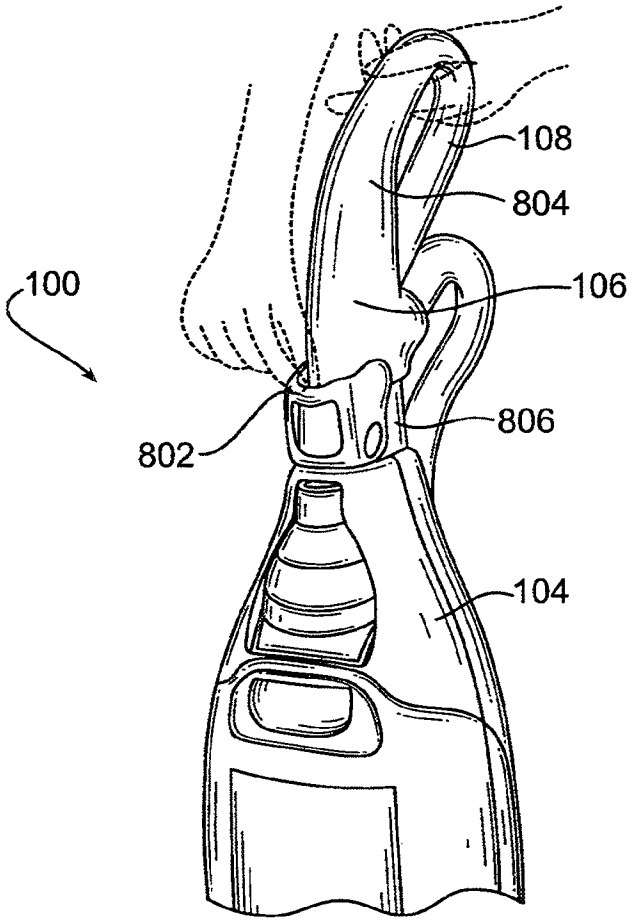
FIG. 8 is a front perspective view of an upper region of the exemplary vacuum cleaner of FIG. 1 shown in a first assembly condition.
Figure 10:
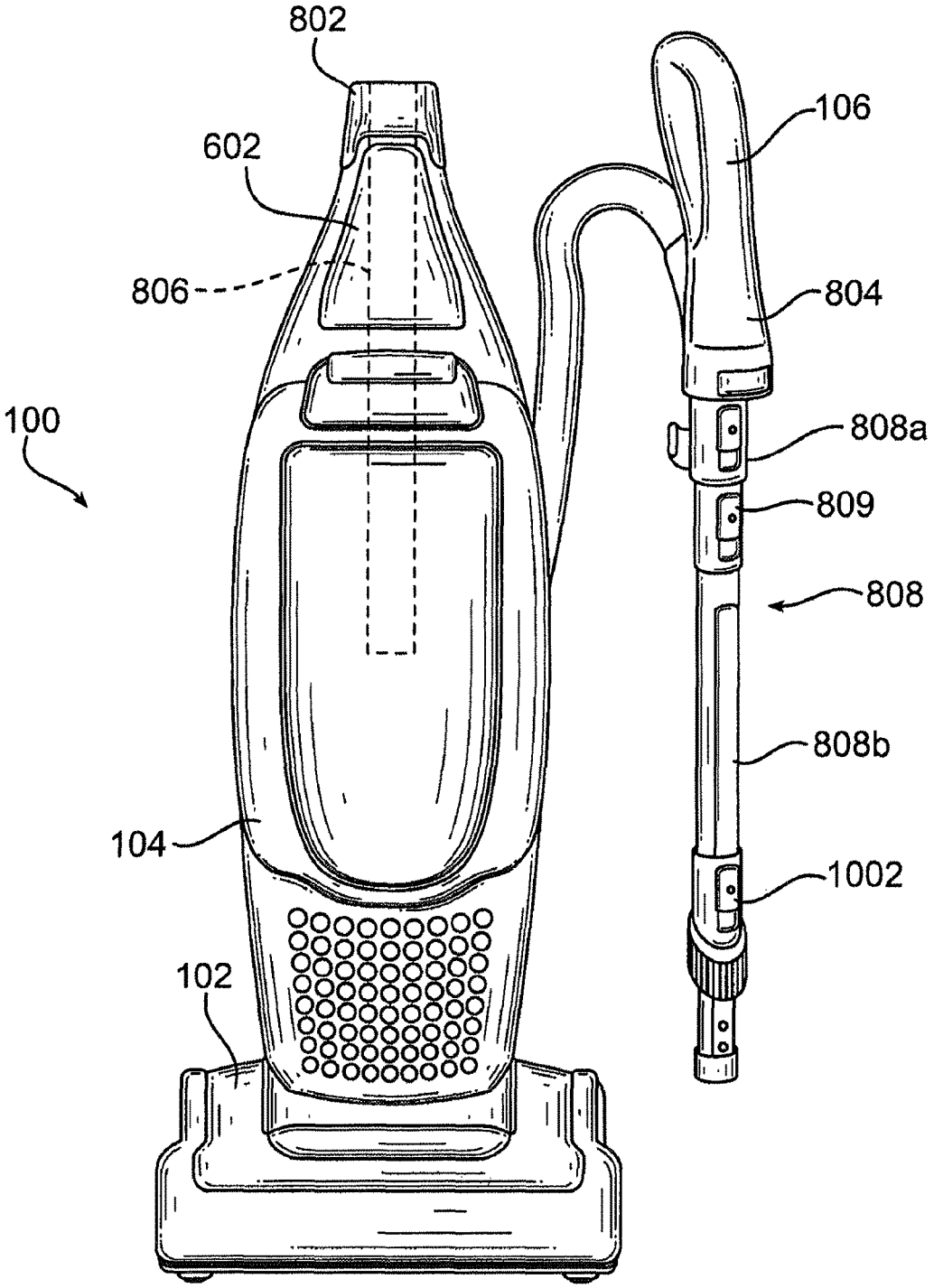
FIG. 10 is a front perspective view of an upper region of the exemplary vacuum cleaner of FIG. 1 shown in a third assembly condition.

Referring now to FIGS. 8, 9, and 10, an exemplary embodiment of the vacuum cleaner may include a handle 106 that can be removed from the rear housing 104. As previously described, the handle 106 has a grip 108 which may be grasped by a user to guide or push the vacuum cleaner 100 over a surface to be cleaned during normal operation. During normal operation, the handle 106 is securely mounted to the rear housing via a latch 802. In an exemplary embodiment, the latch 802 is pivotally mounted to the top portion of the rear housing 104 and is accessible to the user on the front face of the rear housing 104. The handle 106 generally comprises a first portion 804 which comprises the grip 108, and a wand 808 that is attached thereto. The rear housing 104 is provided with a socket 806 sized and adapted to receive the wand 808. The first portion 804 of the handle 106 has a bottom face 810 which acts as a positive stop when the handle 106 is kept in the rear housing 104 in the mounted position. When the handle 106 is in the mounted position, such as shown in FIG. 8, the latch 802 is moved to a locked position to retain the handle 106 in place. To release and then remove the handle 106, including the first portion 804 and the wand 808, the user must pull the latch [808] *802* away from and downwardly with respect to the rear housing 104. Once the latch 802 is moved to this unlocked position, the user may remove the handle 106 for the rear housing 104. In the shown embodiment, the handle 106 is removed by grasping the grip 108 and lifting the handle 106 in an upward and backward direction, but the handle 106 and/or socket 806 may be arranged to join these two parts in other ways.

Referring to FIG. 10, the handle 106, including the first portion 804 and the wand 808, can be completely removed from the rear housing 104 and used as an accessory cleaning wand. The wand 808 may have telescopic features, as are known in the art, such that the length of the wand 808 can be manually adjusted by the user to a desired or predetermined length. The wand 808 may further be fitted with any provided attachments or accessory tools, such as the turbo tool 602. The latch 802 therefore performs the function of selectively retaining the handle 106 and wand 808 inside of the rear housing 104. In an exemplary embodiment, the latch 802 may also be operatively coupled with a valve assembly, such as described in detail below.

Generally referring to FIG. 10, the wand 808 may include one or more rigid pipe sections, which may be fixed-length or telescoping. Any kind of telescoping mechanism may be provided to control the relative positions of one or more rigid pipe sections. Examples of telescoping mechanisms are shown in U.S. Pat. Nos. 6,431,601 and 6,832,784, which are incorporated herein by reference. In an exemplary embodiment, the wand 808 may comprise two pipe sections 808a, 808b. These pipe sections may include a flexible fitment 809 that selectively joins the two pipe sections 808a, 808b. Infinitely-variable adjustment mechanisms are also known, and may be used with other embodiments. To prevent the outer pipe 808b from rotating on the inner pipe 808a, they may be formed with generally circular profiles having matching flat walls or tabs and slots that prevent relative rotation, or other anti-rotation features, as are known in the art.

If the wand 808 is fitted with a rigid pipe section, it may terminate at an accessory tool inlet nozzle, such as turbo tool 602 when connected to the wand 808. In the shown embodiment, a sliding brush tool 1002 may be attached to the wand 808. As shown, the sliding brush tool 1002 comprises a generally tubular brush body that slidingly fits over the outer the pipe 808b. The sliding brush tool 1002 may be securely fastened to the wand 808 using any conventional method, as are well-known in the art. The telescoping pipes (or tubes) 808a, 808b may be removably attached to the handle 106 when it is mounted to the rear housing 104, or they may be stored separately on the vacuum cleaner 100, as is also known in the art.

In an alternative embodiment, the wand 808 may be releasably attached to the handle 106, such as by providing a short mounting tube on the handle 106 to which the wand 808 is selectively attached. Such attachment may be, for example, by bayonet fittings, in which the parts are engaged by inserting one into the other and then rotating the parts into engagement and held by resilient snaps. Such devices and connectors are well-known in the art and it is not necessary to describe them in detail herein. In an embodiment in which the wand 808 is releasably attached to the handle 106, the device may be configured such that the wand can be removed with the handle, as described above, and then removed from the handle 106. Alternatively, the device may be adapted to allow the user to elect whether or not he would like to remove the wand with the handle at the time the handle is initially removed from the housing. For example, the latch 802 may be movable to a first position in which it disengages the handle 106 from the housing 104, but a part on the latch 802 holds the wand 808 in the housing so that the wand is not removed with the handle, and to a second position in which the latch 802 fully releases the handle 106 and the wand 808 to allow them to be removed at the same time. In the foregoing embodiment, the part on the latch 802 that holds the wand 808 in place in the first position may comprise a simple protrusion that is positioned over a corresponding lip at the upper end of the wand 808 to hold it in place. In this embodiment, the wand 808 may frictionally engage a short tube on the handle, and when the handle 106 is pulled out with the latch 802 in the first position, the short tube will pull free of the wand 808, but when the handle 106 is pulled out with the latch 802 in the second position the tube 808 remains connected to the short tube by friction. In another embodiment, the latch 802 may release the handle 106 and the wand 808 at the same time, but the user can elect to leave the wand 808 in the housing 104 by turning the handle 106 to disengage bayonet fittings between the handle 106 and the wand 808 before pulling the handle 106 out.

Figure 11A:
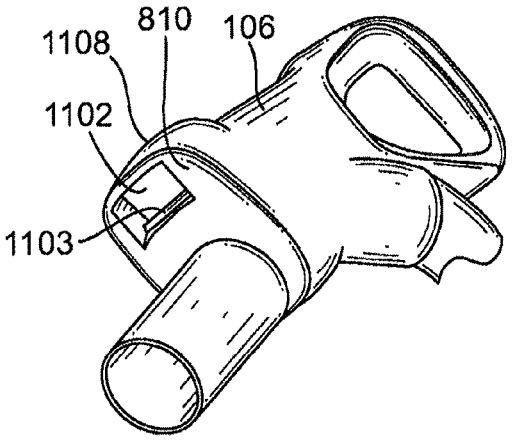
FIGS. 11A-C are views showing an exemplary handle and latch arrangement that may be used in a vacuum cleaner.
Figure 11B:
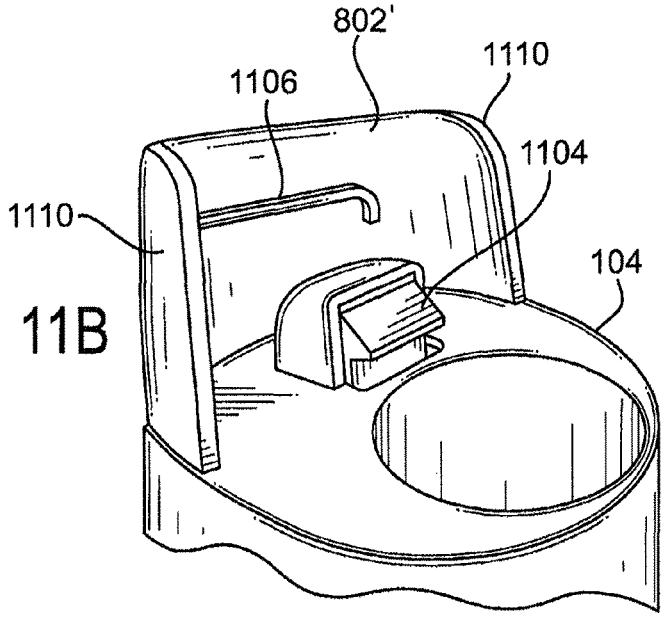
Figure 11C:
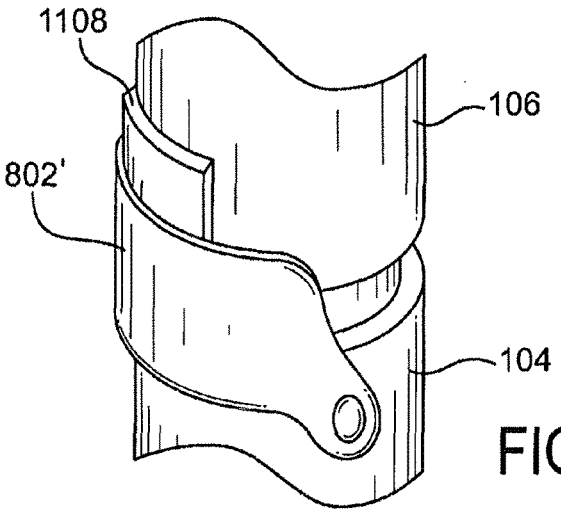

The latch 802 may secure the handle 106 using any arrangement of mechanical locks. For example, as shown, the latch 802 may have an opening that wraps around a protrusion on the handle 106 to hold it in place. As shown in FIGS. 7, 11A, 11B, and 11C the latch and handle may comprise a double retention feature to lock the handle 106 to and release the handle 106 from the rear housing 104. In the exemplary embodiment of FIGS. 11A-C, the latch 802' is provided with dual safety locks to retain the handle 106 in the rear housing. For example, the handle 106 may have a generally square shaped depression 1102 (although the depression may comprise any other shape) on its bottom face 810. The latch 802' may have a corresponding flexible buckle 1104 configured to fit into the depression 1102 and engage a lip 1103 (FIG. 7) in the depression 1102, when the latch 802' is selectively pushed into the retention position. In addition, the handle may have a protrusion 1108 located on its front face. The latch 802' may be provided with a corresponding rib 1106 on its inside face such that when the latch 802' is selectively pushed into the retention position, the protrusion 1108 is secured underneath the rib 1106. The protrusion 1108 and rib 1106 may have any suitable shape (e.g., the rib may be an elongated, inverted U-shaped bar, such as shown in FIG. 11B). Of course, the handle and/or latch may have any other suitable retention mechanism to secure the handle to the rear housing 104. In these or other embodiments, the latch may include sidewalls 1110 that wrap around at least part of the handle 106' to provide lateral stability between the handle and rear housing.

Referring now to FIGS. 1, 12A, 12B, and 13, an exemplary embodiment of the rear housing 104 having a cyclonic-type dirt cup assembly 1200 is shown. The dirt cup assembly 1200, an example of which is described in detail below, fits into a chamber 1202 defined in the rear housing 104 and is covered by a door 1210. The chamber 1202 is a cavity within which the dirt cup assembly 1200 is housed during operation of the vacuum cleaner 100. The chamber 1202 for housing the dirt cup assembly 1200 is open and closed by the door 1204, which may be pivotally mounted to the rear housing 104. The door 1204 may be attached to the rear housing 104 in any suitable manner such that the door 1204 is pivotally or movably mounted thereto. For example, a hinged fitment system may be used to connect the door 1204 to the rear housing 104.

In an exemplary embodiment, the door 1204 is pivotally mounted to the front of the rear housing 104 at or near the base of the housing 104. The door 1204 may have a front surface 1206 and two side surfaces 1208. The front surface 1206 and/or side surfaces 1208 may be constructed with a transparent material, such as plastic, so that the user can monitor the dirt cup assembly 1200 to determine when it must be removed and emptied. The two side surfaces 1208 are generally perpendicular to the front surface 1206 and are coupled to the side surface of the rear housing 104 when the door 1204 is closed. When closed, the door 1204 creates a smooth, continuous shape with the rest of the rear housing 104. The door 1204 may further have a handle 1212 (as shown in FIG. 1) to allow the user to open and close the door 1204 as desired. It should be understood that the door 1204 may be provided with any type of opening-closing and locking mechanisms, as are well known in the arts of enclosures and doors.

In an exemplary embodiment, the door assembly 1204 generally has three operating positions: a closed position, a partially-open position, and a fully-open position. The door assembly 1204 may be provided with a positive stop (not shown) to limit its range of movement, and travel stops that resiliently hold the door 1204 in one or more intermediate positions. Such stops are known in the art. In a preferred embodiment, the door assembly 1204 includes a positive stop that allows the door assembly 1204 to be moved from the fully-closed position, to a partially-open position at about 30° relative to the rear housing 104, and to a fully-open position at about 45° relative to the rear housing 104. The door assembly 1204 should have an operating range so that the dirt cup assembly 1200 can be easily removed from the rear housing 104. When in the closed position, the door 1204 is configured to be latched, snap-fitted, friction-fitted, or otherwise securely closed against the rear housing 104. In an exemplary embodiment, the door assembly 1204 can support at least 2 times the weight of the dirt cup assembly 1204. In an alternative embodiment, the door 1204 may be detachable from the rear housing 104. In an exemplary embodiment, the chamber 1202 may be located in the rear housing 104 above where a post-motor filter chamber 1214 may be located. Generally, the rear housing 104 may be formed integrally or as an assembly of parts. In the exemplary embodiment, the dirt cup assembly chamber 12 is accessible through the door assembly 1204 described above.

In an alternative preferred embodiment, the door assembly 1204 may be omitted and the dirt cup assembly 1200 may be installed to the rear housing 104 in any conventional manner. For example, the dirt cup assembly 1200 may be simply slid into an opening in the rear housing 104 and retained by one or more latch or snaps, or by an elevator lock, as known in the art. In still other embodiments, the dirt cup assembly 1200 may be replaced by a conventional bag filter assembly or other kinds of air filtering device.

Referring back to FIG. 2, the rear housing 104 may be provided with one or more cord retainer hooks 202, 206 that may be used to store a power cord 204 on the vacuum cleaner. A first cord hook 202 is located at the upper end of the rear housing 104. The first cord hook 202 comprises a hook-shaped device having an upwardly-extending projection adapted to retain a cord against the rear housing 104 when the cord is looped over the top of the cord hook 202. The entire hook and projection structure may be a single molded or formed part, or the parts may be formed from separate components. A second cord retainer hook 206 is provided towards the bottom of the rear housing 104. The second cord retainer hook 206 may be constructed much like the first hook 204 but with a downwardly-extending projection. Together, the first and second hook, 204 and 206 provide a means by which a power cord can be efficiently stored against the rear housing 104. The power cord 204 may be of any suitable length and may, in an exemplary embodiment, enter the top of the rear housing 104 at an opening located near a power switch 212. It will be understood, however, that the power cord 204 may enter the vacuum cleaner 100 at any suitable location (such as near the bottom of the rear housing 104), the power switch 212 may be located elsewhere, and the cord 102 may be stored otherwise, such as by being stored in an internal cord reel.

Figure 12B:
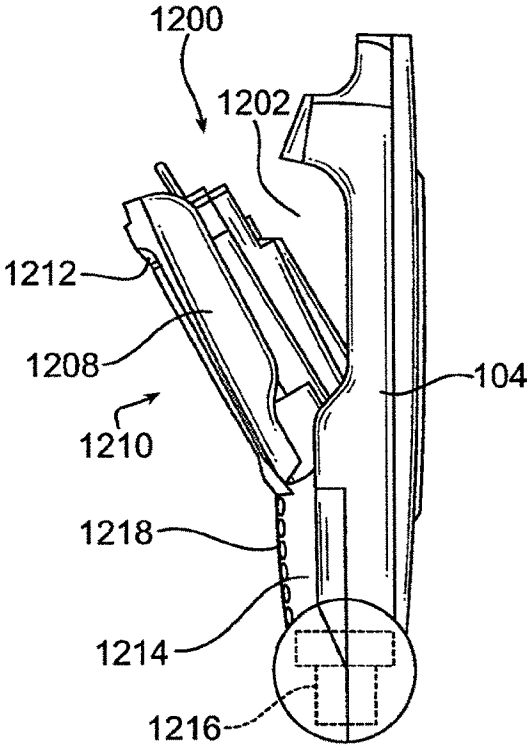
FIGS. 12A and B are side views of a dust cup assembly and rear housing of the exemplary vacuum cleaner of FIG. 1.
Figure 12A:
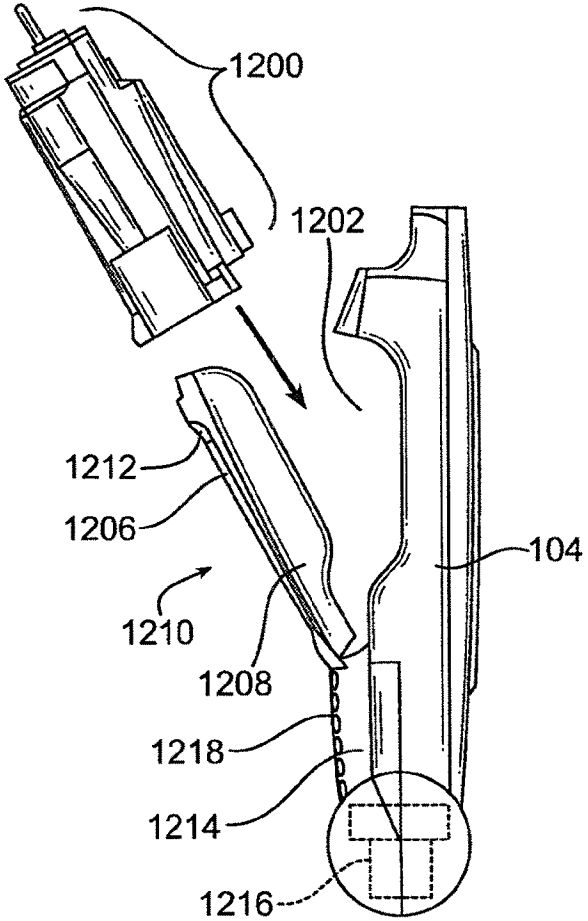

Referring to FIGS. 1, 12A, and 12B, the exemplary rear housing 104 also includes a motor compartment (not shown) located at the bottom of the rear housing 104. A fan motor assembly 1216 fits in the motor compartment. The fan motor assembly may be located anywhere within the rear housing 104, as well-known in the art. The fan motor assembly includes a vacuum fan and an electric motor. The fan and motor are connected to one another, and when the motor is energized by turning on the power switch 212, it drives the fan to generate a vacuum, as known in the art.

The fan and motor may be oriented such that the motor shaft and fan impeller rotate about a generally vertical axis that is generally aligned with the longitudinal axis of the rear housing 104. Moreover, the fan and motor may be fluidly located between the nozzle inlet 310 (FIG. 3) and the dirt cup assembly 1200 (FIGS. 12A and B), in which case the fan would be exposed to the incoming dirty air, and the dirt cup assembly 1200 would operate under positive pressure, rather than negative pressure. However, the fan and motor may be fluidly located between the dirt cup assembly 1200 outlet and a vacuum cleaner outlet. The vacuum cleaner outlet may include a post-motor filter chamber 1214. In this embodiment, the dirt cup assembly 1200 operates under negative pressure, and the air is generally cleaned before entering the fan. In either embodiment, the fan and motor may be assembled into appropriate shrouds and placed in the motor compartment, such that a shroud inlet is in fluid communication with a dirt cup assembly 1200 outlet, and a shroud outlet is in fluid communication with the post-motor filter chamber 1214. To help ensure an air-tight fit between these parts, a seal or seals may be provided around the shroud inlet and outlet and their connections to the dirt cup assembly 1200 and filter chamber 1214.

As noted above, an embodiment of the vacuum cleaner 100 may include one or more post-motor filter chambers 1214, if desired. Such a post-motor filter chamber 1214 may be mounted on the front of the rear housing 104 or elsewhere. In addition, this chamber 1214 may be shaped to encourage even distribution of air across a filter mounted therein. If used, the post-motor filter chamber can house a filter made from any suitable filtration medium. For example, a post-motor filter may comprise a pleated high efficiency filter (such as a HEPA or ULPA filter), a flat filter, or the like. The post-motor filter may be accessed through a filter cover 1218, which may have an operating handle that is accessible at all times, or only when the dirt cup assembly 1200 is removed.

As shown in FIGS. 12A and 12B, the dirt cup assembly 1200 may be positioned generally above a motor compartment and the post-motor filter chamber 1214. It should be noted that the orientations of the dirt cup assembly chamber 1202 and the post-motor filter chamber 1214 may be reversed or otherwise modified. In the shown embodiment, the dirt cup assembly 1200 is primarily adapted for use in an upright vacuum cleaner and can be removably secured to or inside of the rear housing 104. The dirt cup assembly 1200 may comprise multiple components or parts and may be at least partially transparent, but may also be translucent or opaque. By having at least a part of the dirt cup assembly 1200 be transparent, the amount of collected dust can be readily seen by the operator and thereby visually indicates when it should be emptied. The dirt cup assembly 1200 may comprise any suitable dirt separation system.

Figure 13:
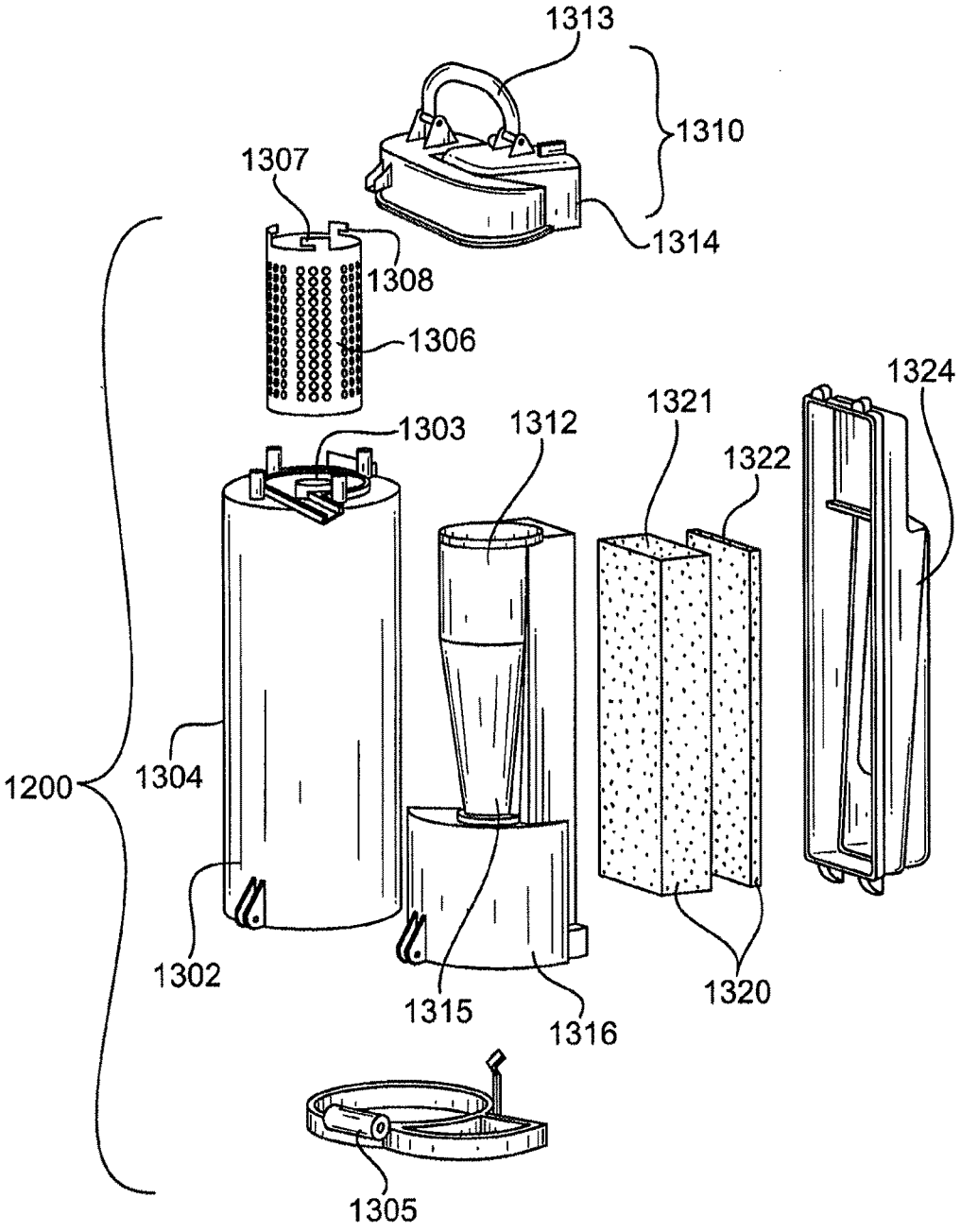
FIG. 13 is an exploded view of a dust cup assembly of the exemplary vacuum cleaner of FIG. 1.
Figure 14:
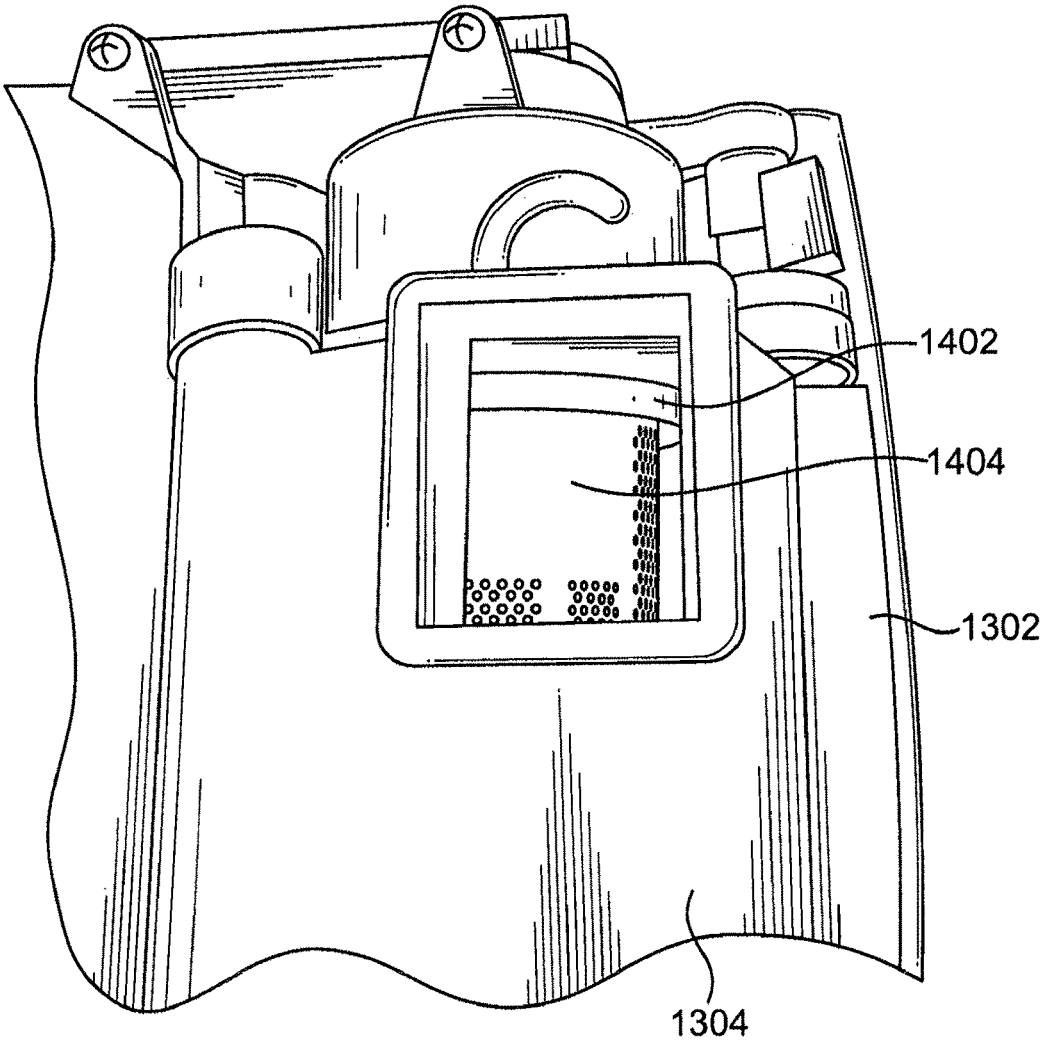
FIG. 14 is a perspective view of a portion of a dust cup assembly of the exemplary vacuum cleaner of FIG. 1.

Referring to FIG. 13, the exemplary dirt cup assembly 1200 may include a primary cyclone 1302 and a secondary cyclone 1312. The primary cyclone 1302 receives a dirt/dust mixture introduced into the vacuum cleaner apparatus 100 either through the floor inlet 310 or through an accessory cleaning inlet, such as an inlet provided in the handle 106. The primary cyclone 1302 has a sidewall 1304 that forms both a cyclone chamber and a dirt receptacle. The sidewall 1304 may include an air inlet opening 1402 (FIG. 14) that is attached to a dirty air passage (not shown) in the vacuum cleaner when the dirt cup assembly 1200 is mounted to the rear housing 104. The primary cyclone 1302 may include a filter, such as a perforated screen 1306, located generally centrally therein and covering a primary cyclone outlet 1303 located at one end (preferably the top end) of the primary cyclone 1302. The perforated screen 1306 may have any arrangement of holes, meshes or filter surfaces, and may be replaced by a pleated filter or other filtering devices, as known in the art. The screen 1306 also may comprise a multi-stage filter of any kind, as known in the art. The screen 1306 or other filter may be cylindrical, as shown, conical, frustoconical, or shaped otherwise. Also, the screen 1306 or other filter may be closed at its bottom end, and open at the end that mates with the primary cyclone outlet 1303, and it may include a plate located at its bottom end or other features to help control airflow in the primary cyclone 1302. The screen 1306 also may include grips or a handle at the lower end to facilitate installation and/or removal. As shown in FIG. 14, the perforated screen 1306 may have a partial solid wall 1404 that is aligned with the opening 1402. The primary cyclone 1302 may have a pivotally operable lower wall 1305, which may be held in place by a latch and opened by directly operating the latch or operating the latch remotely through a cable or pushrod, as known in the art.

The secondary cyclone 1312 receives air exiting the primary cyclone 1302 and filters fine particles and dust from the airflow, and deposits such materials into a receptacle 1316. The secondary cyclone may include a funnel-shaped portion 1315, as known in the art. The receptacle 1316 may be covered by the lower wall 1305 for simultaneous emptying of both cyclones, or by a separate lower wall. In other embodiments, one or more separate and removable dirt-collection cups may be provided in place of the openable lower wall 1305, as well-known in the art.

In the shown embodiment, a single cover 1310 is provided over the primary and secondary cyclones 1302, 1312, but separate covers may be used instead. The cover 1310 may have a handle 1313 integrated into or attached to it, if desired. Also if desired, the cover 1310 may be removable to allow the operator to invert and empty the cyclones. In such an embodiment, an openable lower wall 1305 or separable dirt cups may not be required. The cover 1310 includes a first air passage (not shown) that directs air from a primary cyclone outlet 1303 to a secondary cyclone inlet (not shown). The cover 1310 also includes a second air passage (not shown) that conveys air from a secondary cyclone outlet to a dirt cup assembly outlet 1314. A filter 1320, such as a pleated filter or a two-tiered filter 1320 comprising a foam filter 1321 and a micron filter 1322, may be mounted to the dirt cup assembly 1200 and in fluid communication with the dirt cup assembly outlet 1314. In the shown embodiment, the filter 1320 is mounted to the rear side of the dirt cup assembly 1200 under a filter frame 1324. The filter frame 1324 is generally enclosed, but includes an opening (not shown) that mates with an air passage that leads to the fan motor assembly 1216.

In use, the fan motor assembly 1216 draws a dirt-laden stream of air into the primary cyclone 1302 for separation. The dirty air swirls in the primary cyclone 1302, removing larger particles and some smaller particles, passes through the screen 1306 and primary cyclone outlet 1303, and enters the secondary cyclone 1312 where it is further filtered before exiting to the filter 1320 and fan motor assembly 1216.

In an exemplary embodiment, the screen 1306 may be removably fastened to, and extend downwardly from, an upper wall of the primary cyclone 1302 and/or the cyclone lid 1310 (for purposes of this disclosure, the lid 1310 may include a portion of the top of the primary cyclone 1302 surrounding the primary cyclone outlet 1303, and both parts will simply be referred to as the cyclone lid 1310). In an exemplary embodiment, the screen 1306 is provided at its upper end 1307 with a plurality of mounting hooks 1308 to secure the screen 1306 to corresponding slots or grooves (not shown) in the cyclone lid 1310. The mounting hooks 1308 extend upwardly from and are spaced circumferentially about the open end. The mounting hooks 1308 may be arranged, however, such that the screen 1306 may be attached to the lid 1310 only in one or more discreet orientations. For example, the mounting hooks 1308 and their corresponding slots may not be spaced equi-angularly about the circumference of the upper end 1307, to ensure that the screen 1306 can only be mounted to the cyclone module 1310 in a particular orientation and spatial relationship. Alternatively, the mounting hooks 1308 and their corresponding slots may have a different shape or size, or may be staggered in the radial direction, to ensure that the screen 1306 is attached in a specific orientation. The foregoing arrangement may be desirable to ensure that the partial solid wall 1404 is mounted adjacent the inlet 1402. While not required, providing a partial solid wall 1404 may help establish a cyclonic airflow within the primary cyclone 1302, and may prevent dirt and debris from clinging to the screen 1306.

Each of the hooks 1308 has a circumferentially directed projection that defines a slot-like void between a bottom edge of the projection and the top edge of the open end 1307. As noted above, the hooks 1308 fit into corresponding slots in the lid 1310, and when the screen 1306 is rotated, the hooks 1308 slide over surfaces 1602 on the lid 1310 to hold the screen 1306 in place. If necessary, bumps or expanded surfaces may be provided on the hooks 1308 or elsewhere to engage a corresponding surface in a resilient (e.g., snap-fit) engagement, to resiliently hold the screen 1306 in place. Such hooks 1308 and corresponding slots are known in the art of vacuum cleaners.

In an exemplary embodiment, a feature may be provided to disengage the screen 1306 (or other filter) from the lid 1310 without having to directly contact the screen 1306. For example, referring to FIGS. 15A, 15B and 16, the cyclone module 1310 (partially shown) may comprise a lever assembly 1500 that may be operated to push the hooks 1308 out of engagement with the lid 1310. The exemplary lever assembly 1500 comprises a release lever 1502 that is attached to (or formed with) a release member 1604 that extends from the release lever 1502 to a point adjacent the hooks 1308 and their corresponding slots. The release member 1604 includes protrusions 1606 that are located adjacent the ends of the hooks 1308. When the release lever 1502 is rotated, the protrusions 1606 press against the hooks 1308 and drive them backwards until they are free to drop out of the slots. As shown, the release member 1604 may have an opening 1608 that allows air to pass from the primary cyclone outlet 1303 to the secondary cyclone 1312. Alternatively, the release member 1604 may be formed as a ring-like member that surrounds the primary cyclone outlet 1303 generally flush with the outlet 1303, or the release member 1604 may be formed in any other shape that can be used to move the hooks 1308 out of engagement, while not significantly impeding airflow through the outlet 1303.

Figure 15A:
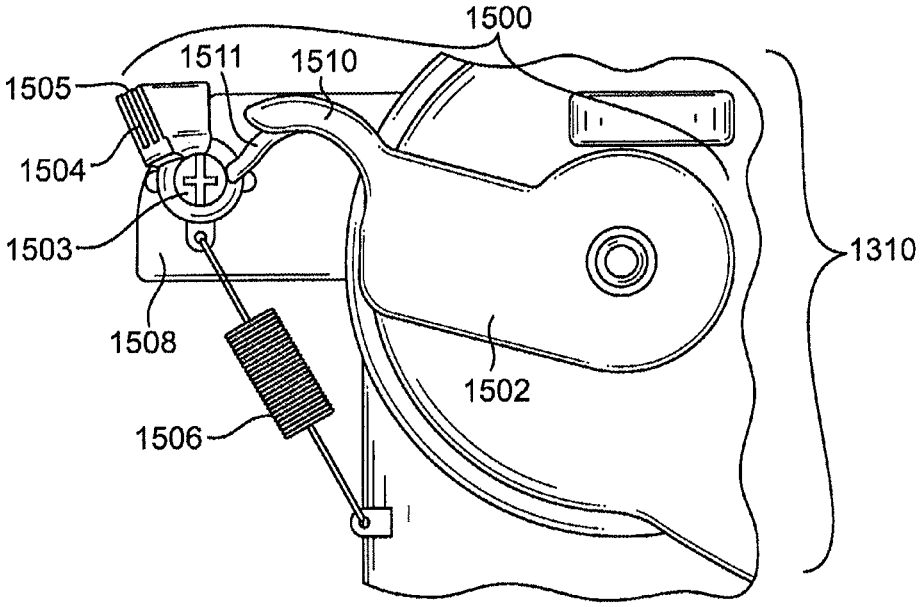
FIGS. 15A and 15B are plan views of an exemplary filter-in-place arrangement for a cyclone module.
Figure 15B:
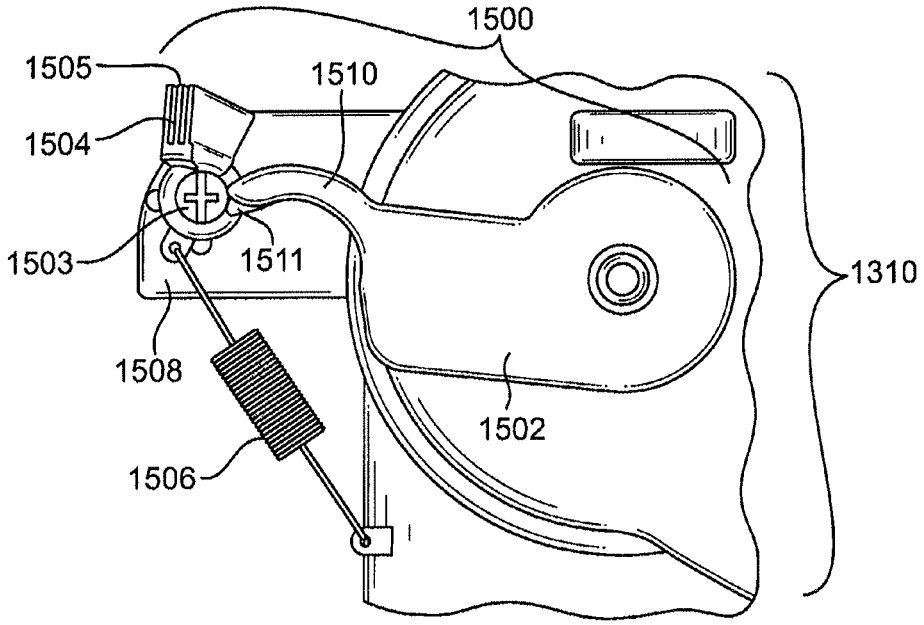
Figure 16:
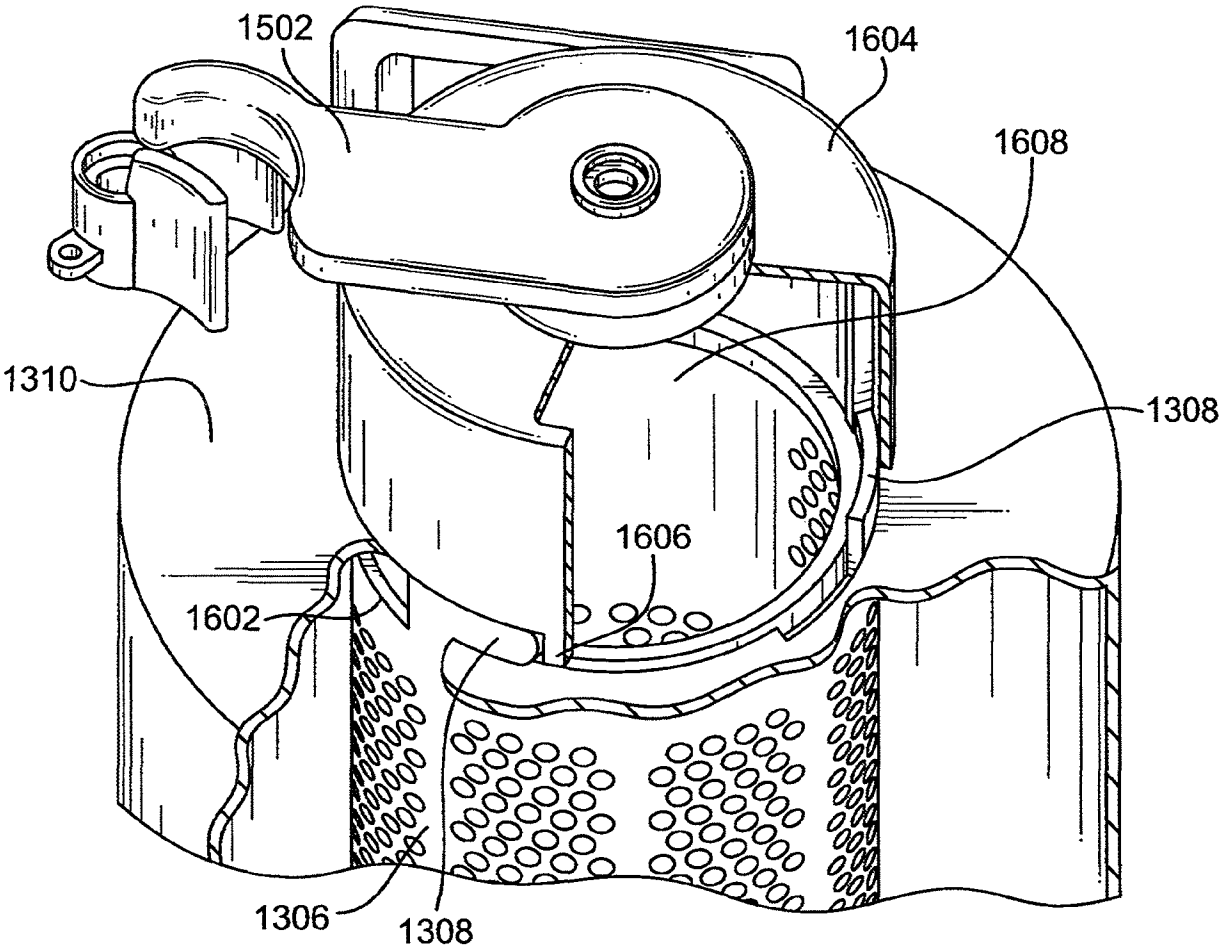
FIG. 16 is a partially cutaway perspective view of an exemplary cyclone module.

As shown in FIGS. 15A and 15B, the release lever 1502 may also include a filter-in-place mechanism that prevents the dirt cup assembly 1200 from being installed on the rear housing 104 when the filter or screen 1306 is not installed. In this embodiment, the filter-in-place mechanism comprises a filter-in-place lever 1504, and a spring 1506. The filter-in-place lever 1504 is mounted on a portion 1508 of the dirt cup assembly 1200 (such as on the lid 1310) located near the perimeter of the dirt cup assembly 1200, and positioned and shaped so that it can contact the filter release lever 1502. The spring 1506 is attached at one end to the filter-in-place lever 1504, and at the other end to the dirt cup assembly (such as to the lid 1310). The spring is adapted to pivot the filter-in-place lever 1504 about a fulcrum 1503 outwards away from the center of the dirt cup assembly 1200, so that an end 1505 of the filter-in-place lever 1504 protrudes outward to prevent the dirt cup assembly 1200 from fitting in place on the rear housing 104, as shown in FIG. 15A.

When a user attaches the screen 1306 to the cyclone lid 1310, the mounting hooks 1308 of the perforated screen 1306 press against the release mechanism protrusions 1606 and rotate the release lever 1505. When this happens, a protrusion 1510 on the release lever 1502 presses against a corresponding protrusion 1511 on the filter-in-place lever 1504 and rotates the filter-in-place lever 1504 against the bias of the spring 150 into a position in which the surface 1505 does not obstruct installation of the dirt cup assembly 1200, as shown in FIG. 15B. To detach the perforated screen 1306, the user can use the protrusion 1510 as a finger pull to rotate the release lever 1502 in a clockwise direction, thereby releasing the perforated screen 1306 by gravity from the cyclone module 1310. When the filter is removed, the spring 1506 pulls the filter-in-place lever 1504 into its obstructing position.

Figure 17:
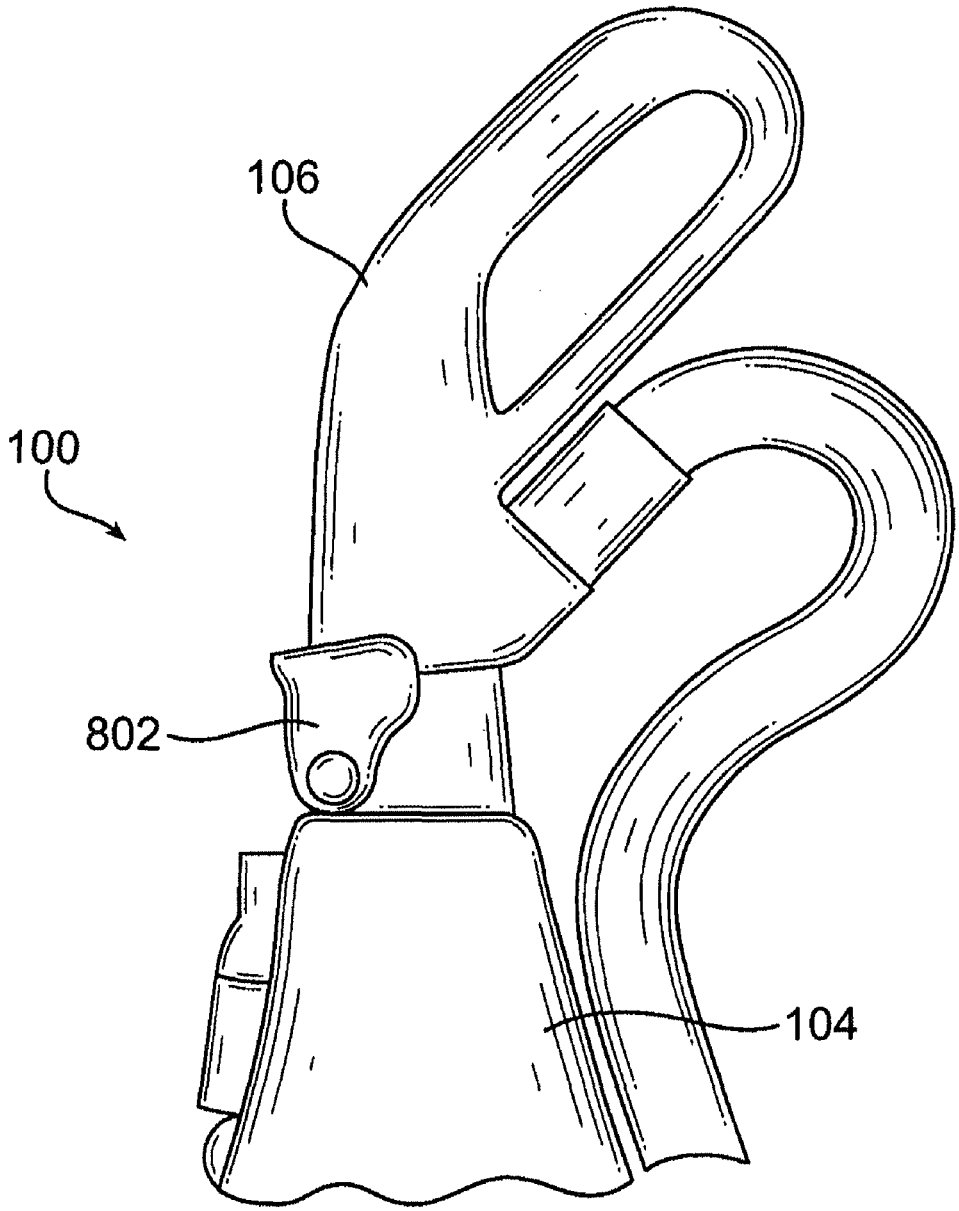
FIG. 17 is a side view of an upper region of the exemplary vacuum cleaner of FIG. 1.

Referring to FIG. 17, the upper region of a vacuum cleaner 100 is shown according to an exemplary embodiment. As previously explained, the vacuum cleaner 100 comprises a handle 106 mounted to the rear housing via a latch 802. And as previously explained above, the handle 106 may be removable from the rear housing 104 in order to expose a wand (not shown) to be used as an accessory cleaning wand. The latch 802 may, in an exemplary embodiment, be pivotally secured to the rear housing 104 and include a snap fitment arrangement (not shown). The latch 802 may be secured to the rear housing 104 by any appropriate fastening means, such as by screws, nuts and bolts, etc.

Figure 19:
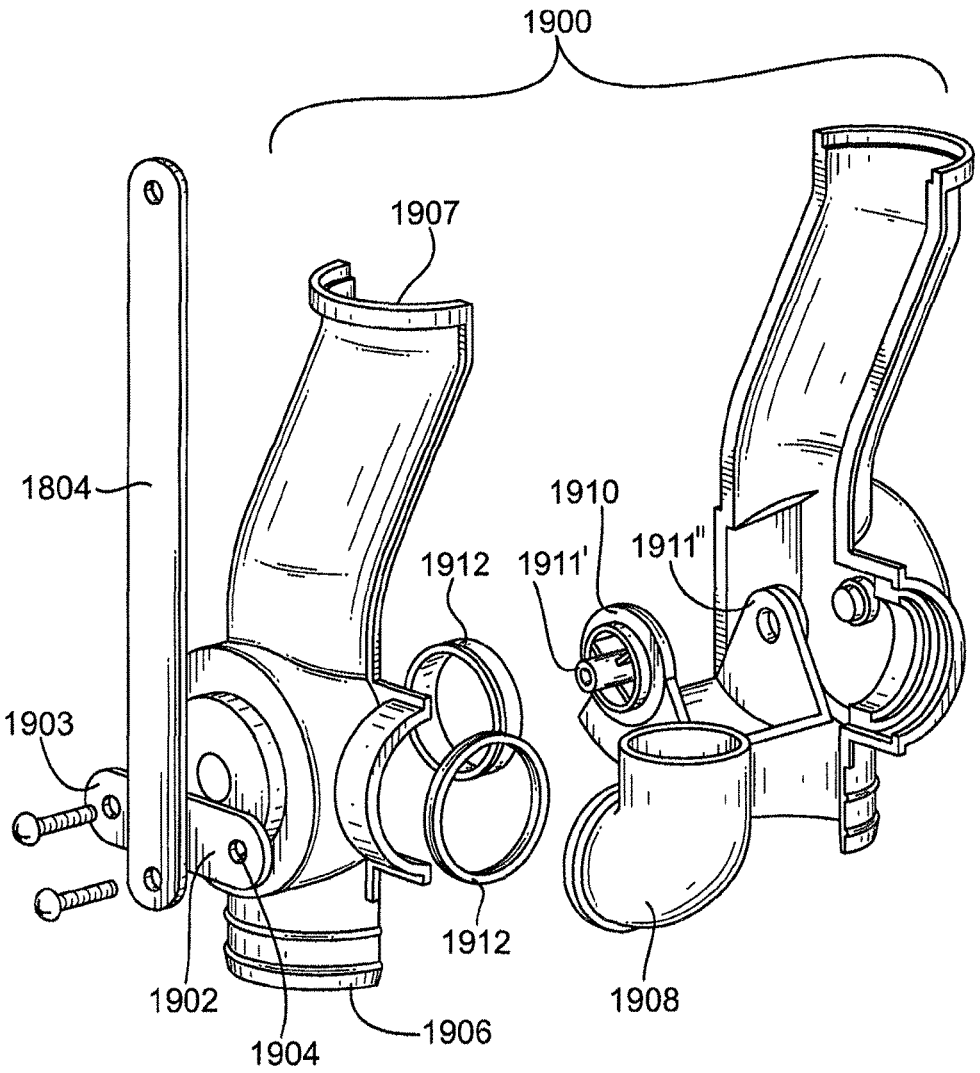
FIG. 19 is an exploded view of a valve assembly of the exemplary vacuum cleaner of FIG. 1.

While the latch 802 may be used simply to secure the handle 106 to the housing 104, it has been found that the latch 802 may advantageously also be used to operate an air flow control valve that selectively directs airflow through the handle 106 when it is in use. The valve may be any suitable type that is capable of diverting flow from one path to another path, such as a rotary valve, slide valve, three way valve, etc. As shown in FIG. 19, an exemplary valve assembly 1900 comprises a pair of housing members (shown in exploded view) that house a barrel valve 1910. The barrel valve 1910 is pivotally mounted in the valve assembly 1900 by pivots 1911', 1911". A valve lever 1902 is mounted at one of its ends 1903 to one pivot 1911', The valve lever 1902 is mounted external to the valve housing, and can be moved to remotely rotate the barrel valve 1910 between its operating positions. The valve assembly 1900 includes a floor inlet 1906, an accessory inlet 1908, and an outlet 1907. The floor inlet 1906 is connected to the floor inlet nozzle 310 via hose assembly 316 or other means. The accessory inlet 1908 is attached to a hose 112 that extends to the handle 106. The accessory inlet 1908 may comprise a pivotal elbow, as shown, or comprise a simple inlet opening. Gaskets 1912 may be provided throughout the valve assembly 1900 to help prevent airflow leaks. The outlet 1907 is attached to a conduit that leads to the dirt cup assembly 1200 or any other suitable dirt separation system. The valve assembly 1900 may be located at the bottom end of the rear housing, or elsewhere on the vacuum cleaner 100.

The barrel valve 1910 has two terminal positions: one in which it blocks the floor inlet 1906 and allows air to pass from the accessory inlet 1908 to the outlet 1907 (the accessory cleaning position), and one in which it blocks the accessory inlet 1908 and allows air to pass from the floor inlet 1906 to the outlet 1907 (the floor cleaning position). The valve 1910 may be moved to either of these positions by rotating the valve lever 1902, and may be located in intermediate positions by partially pivoting the valve lever 1902.

Figure 18B:
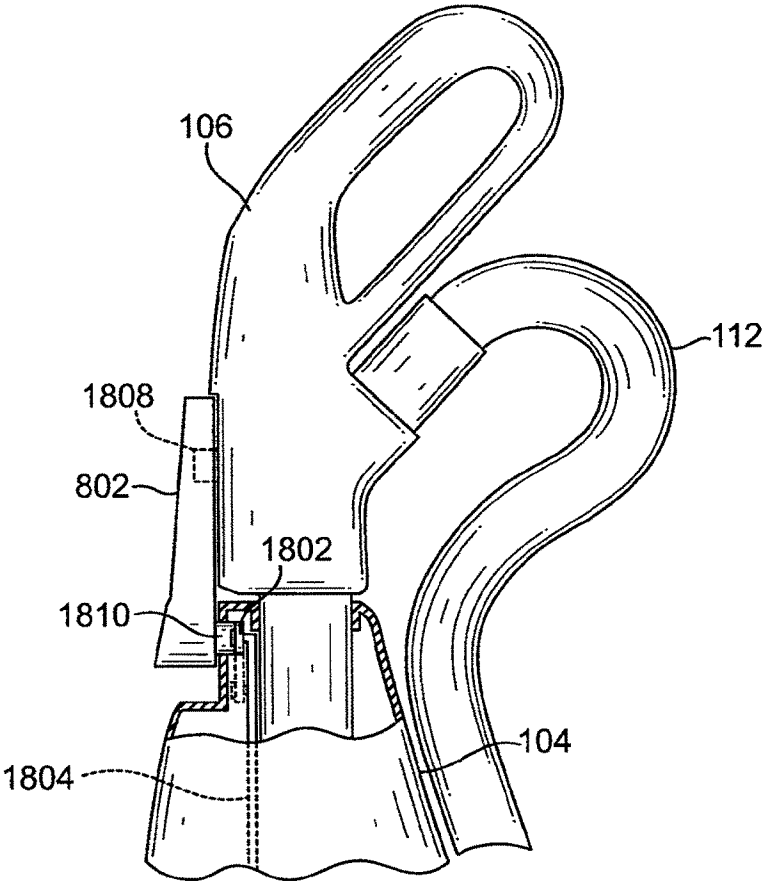
FIGS. 18A and 18B are a front and side views, respectively, of an upper region of the exemplary vacuum cleaner of FIG. 1.
Figure 18A:
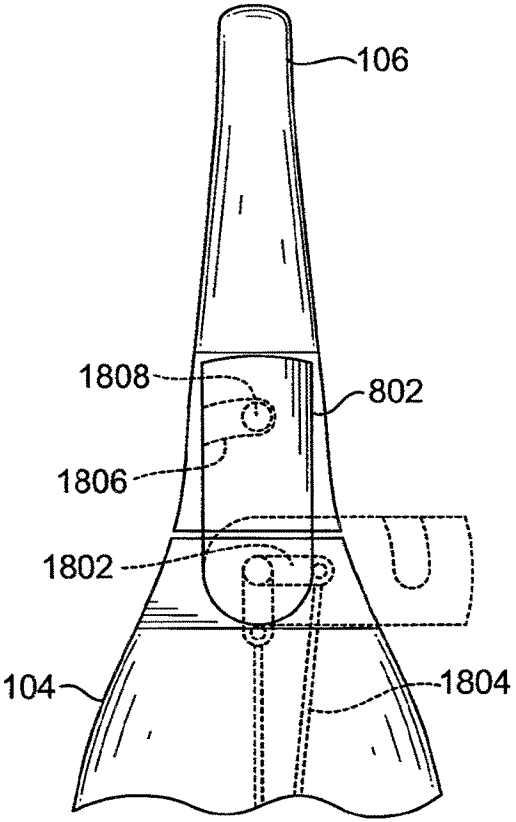

The latch 802 is operatively connected to the valve lever 1902 so that the latch 802 generally simultaneously operates the valve 1910 and releases or secures the handle 106. In the embodiment of FIGS. 18A and 18B, the latch 802 comprises a rotating lever that pivots from a vertical position to a horizontal position. The rear surface of the latch 802 includes a slot 1806 that engages a pin 1808 on the handle 106 when the latch 802 is pivoted to the vertical position, to thereby lock the handle 106 in position on the housing 104. The latch 802 is pivotally mounted to the housing 104 by a shaft 1810. Inside the housing 104, the shaft 1810 is attached to a lever arm 1802, which, in turn, is attached to a linkage 1804 that is connected to the valve lever 1902 at an end 1904 distal from the end 1902 that is attached to the valve 1910. The lever arm 1802 rotates simultaneously with the latch 802, and moves the valve 1910 into the floor cleaning position when the latch 802 is upright, and moves the valve 1910 into the accessory cleaning position when the latch 802 is horizontal. If desired, one or more detents and corresponding resilient members may be provided on the valve assembly 1900 and/or latch 802 to hold these parts in the terminal positions, or in intermediate positions, or one or more springs may used to accomplish the same.

In the foregoing embodiment, the latch 802 may be turned back towards the upright position after the handle 106 has been removed in order to regulate the flow of air through the handle. This may be advantageous, for example, to decrease suction when cleaning delicate objects, such as when dusting or cleaning blinds or curtains. In addition, the housing 104 may include one or more vents that allow air to flow into the handle 106 (or an extension wand attached to the handle) after the latch 802 is pivoted to the horizontal position but before the handle 106 is removed, in order to prevent the suction caused by moving the valve to the accessory cleaning position from holding the handle 106 in place in the housing 104. The latch 802 may be operated to release the handle 106 and direct the airflow through the handle 106 at approximately the same time. If desired, however, the portion of the latch 802 that holds the handle 106 in place, and the linkage connecting the latch 802 to the valve assembly 1900 may be modified to stagger the unlocking/locking and valve operating functions. For example, the latch 802 may be adapted to fully release the handle 106 before the valve changeover begins to occur, or vice versa. The latch 802 also may be configured to have a first position in which it releases the handle 106, but not an associated wand 808, and a second position in which it releases the handle 106 and an associated wand 808. Such variations will be understood by persons of ordinary skill in the art in view of the present disclosure. It should also be observed that the illustrated valve assembly and operating latch 802 do not include springs, which can deform over time, but the absence of springs certainly is not required in all embodiments, and may be preferable under some circumstances.

Figure 20A:
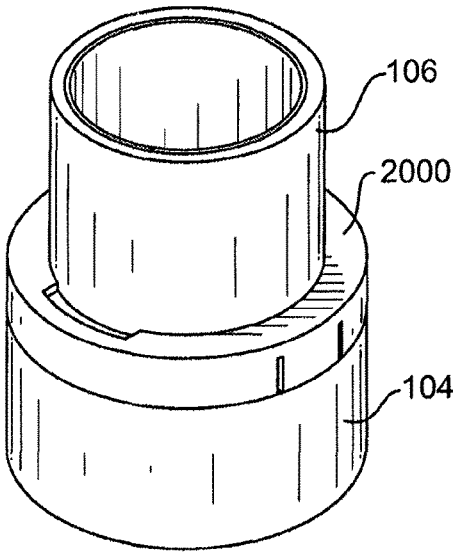
FIGS. 20A and 20B are assembled and disassembled perspective views, respectively, of another embodiment of a handle latch for a vacuum cleaner.
Figure 20B:
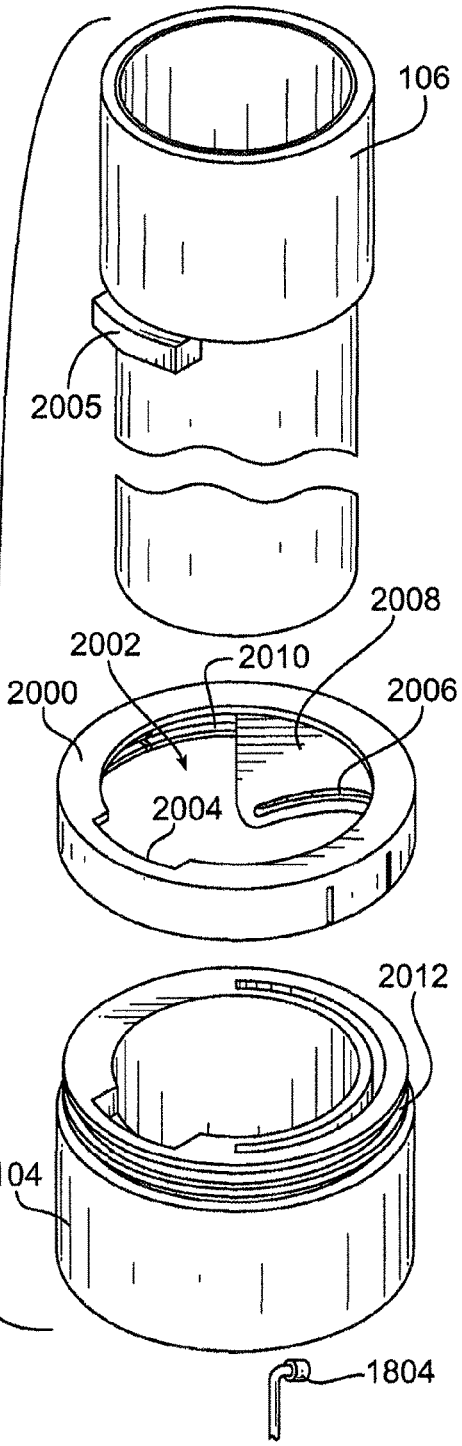
Figure 21A:
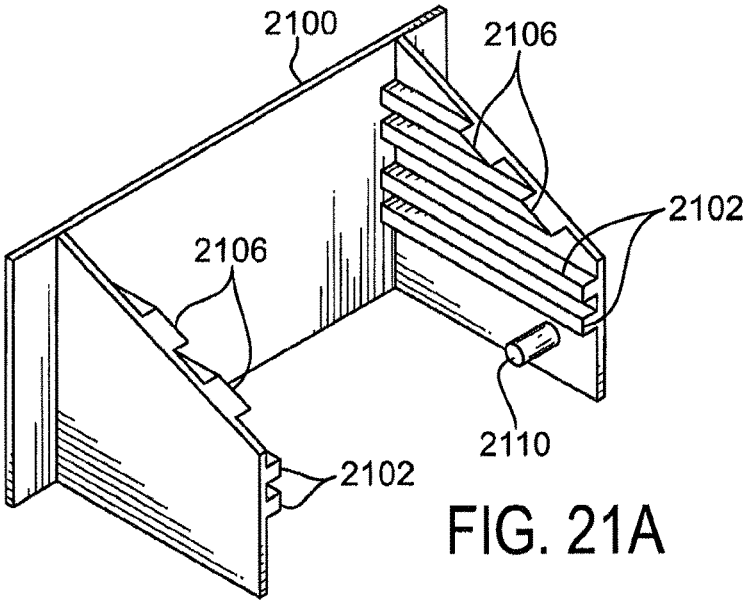
FIG. 21A is a perspective view of another embodiment of a handle latch for a vacuum cleaner.
Figure 21B:
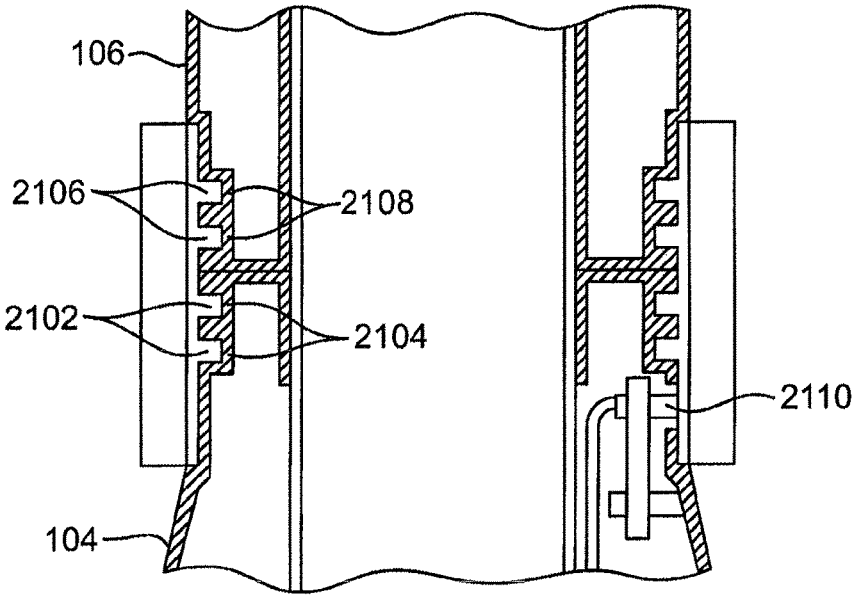
FIG. 21B is a rear cross-section view of the latch of FIG. 21A.
Figure 21C:
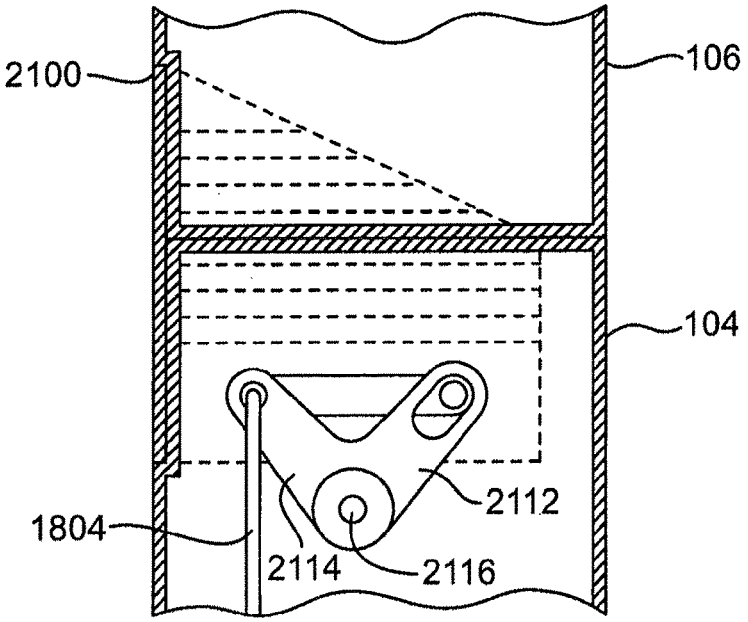
FIGS. 21C and 21D are side cross-section views of the latch of FIG. 21A, shown in two operating states.
Figure 21D:
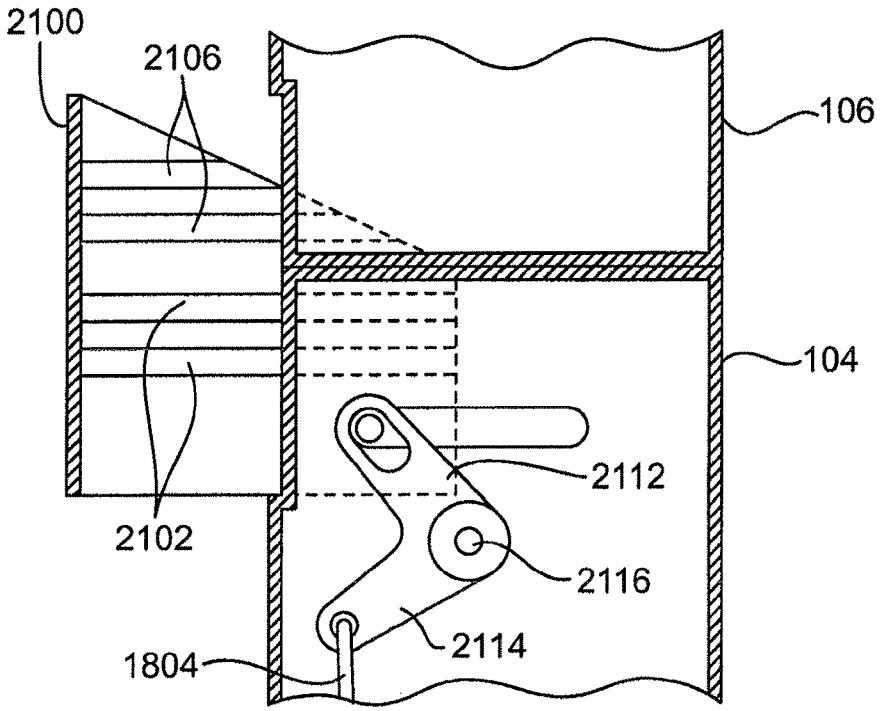

FIGS. 20A and 20B illustrate an alternative embodiment in which the rotating latch of FIGS. 18A and 18B has been replaced by a latch that pivots generally about the axis of the rear housing 104. In this embodiment, the latch 2000 comprises a collar having a central opening 2002 into which the end of the handle 106 fits. The opening includes one or more cutouts 2004 that receive corresponding flanges 2005 on the handle 106. The latch 2000 is rotatably mounted on the rear housing 104 by any suitable mechanical arrangement, such as by having a flange 2010 that extends down from the outer perimeter of the latch 2000 to engage a corresponding protrusion 2012 on the rear housing 104. The flange 2010 may be flexible to snap fit over the housing protrusion 2012. The handle 106 is installed by inserting the end of the handle 106 through the opening 2002, and rotating the latch 2000 until the cutout 2004 is aligned with the corresponding protrusion on the handle 106 to allow the protrusion to pass through the cutout 2004. At this point the latch 2000 is rotated to move the cutout 2004 away from the protrusion and thereby prevent the handle 106 from being removed. The latch 2000 also includes a ramp 2006 into which an end of the valve linkage 1804 fits. The ramp 2006 is formed as a slot in a generally cylindrical boss 2008 that extends down from the latch 2000. As the latch 2000 is rotated, the ramp pulls the valve linkage 1804 up, or pushes it down, depending on the direction of rotation, to operate the valve assembly 1900 at generally the same time that the latch 2000 is used to lock and unlock the handle 106.

FIGS. 21A-D provide another embodiment of a latch 2100 that may be used to both secure the handle 106 to the rear housing 104, and operate a valve assembly. In this embodiment, the latch 2100 is mounted to the rear housing by tabs 2102 that fit into corresponding tracks 2104 on the rear housing 104. The tabs 2102 and/or tracks 2104 may include a travel stop to prevent them from completely disengaging. The latch 2100 also includes tracks 2106 that fit into corresponding tracks 2108 on the handle 106, when the handle 106 is fully seated on the rear housing 104. The parts are arranged and dimensioned such that the handle tabs and tracks 2106, 2108 can be disengaged without removing the latch 2100 from the rear housing 104. The latch 2100 includes a pin 2110 that fits in a slot in a slotted lever arm 2112. The slotted lever arm 2112 is rigidly attached to a link 2114 to form an L-shaped member, which is pivotally mounted inside the rear housing 104 on a fulcrum 2116. The link 2114 is pivotally attached to a valve linkage 1804, to operate a valve assembly as the latch is moved between the locked and unlocked positions, such as described above.

Figure 22B:
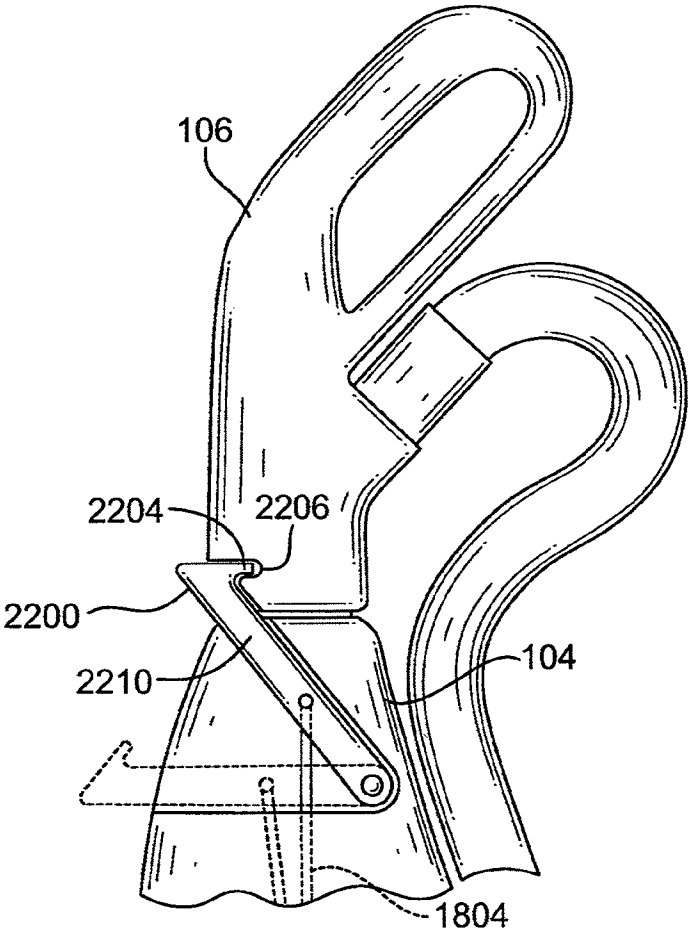
FIGS. 22A and 22B are front and side views of another embodiment of a handle latch for a vacuum cleaner.
Figure 22A:
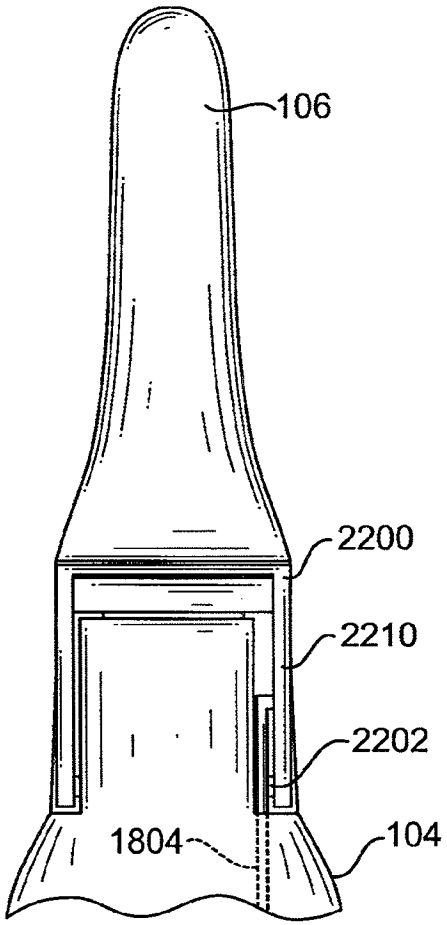
Figure 23B:
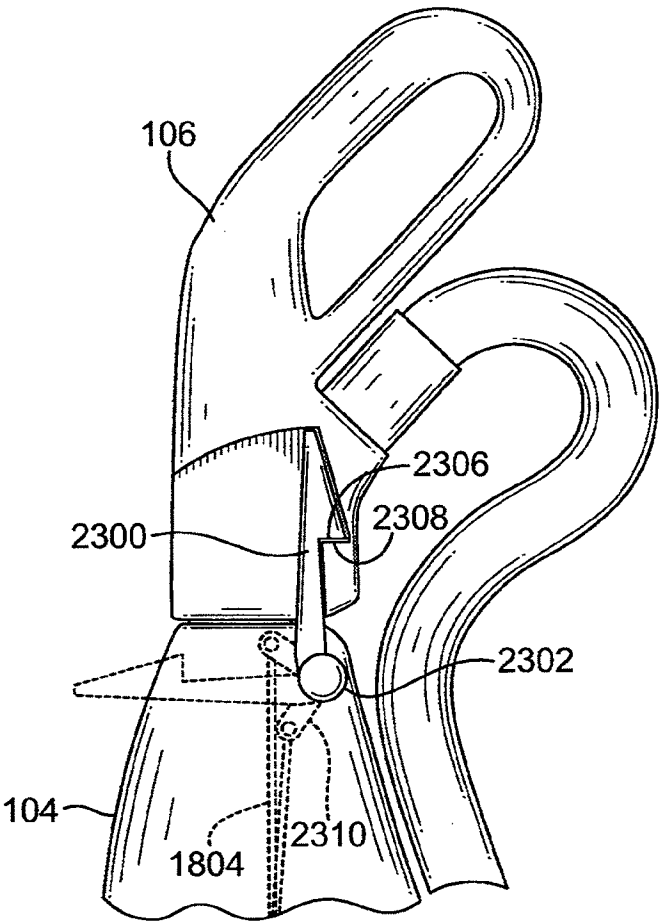
FIGS. 23A and 23B are front and side views of another embodiment of a handle latch for a vacuum cleaner.
Figure 23A:
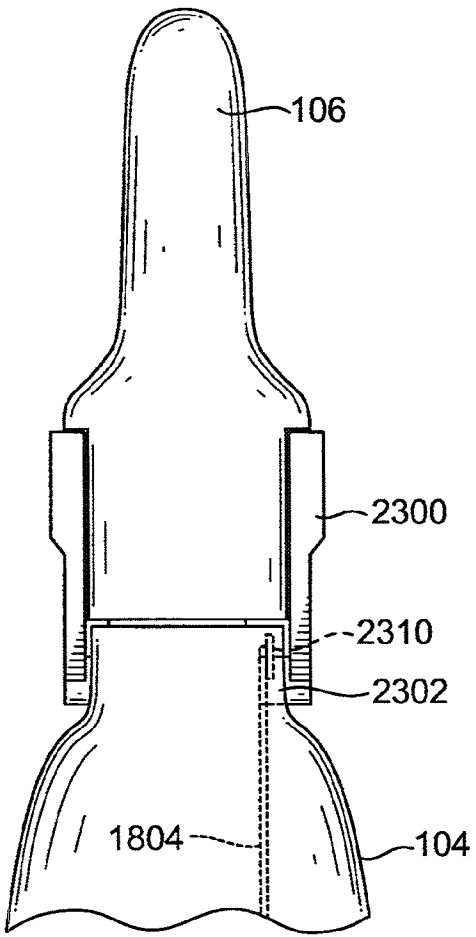

FIGS. 22A, 22B, 23A and 23B provide additional embodiments of handle latches that are adapted to substantially simultaneously operate a valve. In the embodiment of FIGS. 22A and 22B, the latch 2200 comprises a loop-shaped member that is pivotally mounted to the rear housing 104 on a pivot shaft 2202. The latch 2200 includes a tab 2204 that engages a slot 2206 on the handle 106 to lock the handle 106 in place on the rear housing 104. One arm 2210 forming the loop is connected to a valve linkage 1804 to open and close a valve. Similarly, the embodiment of FIGS. 23A and 23B has a latch 2300 that is pivotally mounted on the rear housing 104 by a pivot shaft 2302. The pivot shaft 2302 has a lever arm 2310 that is attached to the valve linkage 1804. In the embodiment of FIGS. 23A and 23B, the latch 2300 comprises a single part mounted on one side of the device, or a pair of parts mounted on opposite sides of the device, by which the user can operate the latch. A protrusion 2306 is provided on one or both sides of the latch 2300 to engage a corresponding shelf 2308 formed on the handle 106, to hold the handle 106 in place.

In the foregoing Figures the various embodiments of latches are shown in alternate positions by dotted lines.

While the foregoing embodiments illustrate the use of a simple arm as the linkage 1804 that connects the latch to the valve, it will be appreciated that other kinds of linkage may be used, such as cables and the like. Also, the linkage may comprise a simple direct connection between the latch and the valve. That is to say, the valve and latch may be integrally connected or formed. In addition, the foregoing embodiments use a handle latch that is operated to control the valve, but it will be readily appreciated that the embodiments can be reversed such that a valve handle is used to remotely operate a handle latch. In either event, a single user interface, in the form of a moving handle or the like, is operated to substantially simultaneously operate an airflow control valve and release a handle from the vacuum cleaner housing.

Figure 24:
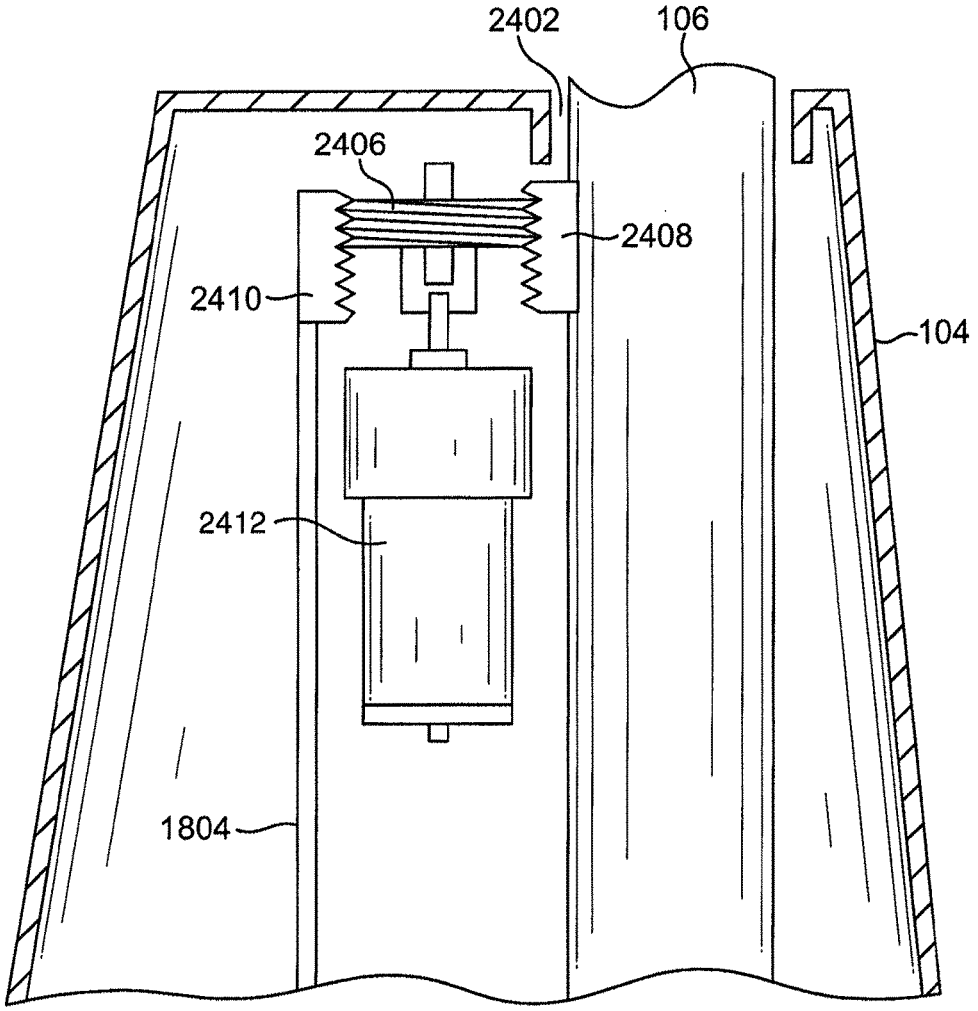
FIG. 24 is cross-sectional view of an embodiment of a motorized handle release system for a vacuum cleaner.

FIG. 24 provides another embodiment of a handle attachment and valve operating arrangement. In this embodiment, the handle 106 is installed into a hole 2402 in the rear housing 104. A motor 2412, such as a reversible DC electric motor, is mounted in the rear housing 104 and drivingly connected to a shallow-angle gear 2406. The handle 106 includes a corresponding gear tooth set 2408 that is driven upwards and downwards by the shallow-angle gear 2406, depending on the direction in which the motor 2404 is rotated. Similarly, a valve linkage 1804, like the linkages described above, is provided with a gear tooth set 2410 that is driven up and down at the same time as the handle 104. In this embodiment, the motor 2404 is operated to simultaneously release the handle and operate the valve.

The present disclosure describes a number of new, useful and nonobvious features and/or combinations of features that may be used alone, together, with upright vacuum cleaners, canister vacuum cleaners or other types of cleaning device, or in other ways. The embodiments described herein are all exemplary, and are not intended to limit the scope of the inventions in any way. It will also be appreciated that the embodiments shown herein can be used separately from one another, or in various combinations. It will be appreciated that the inventions described herein can be modified and adapted in various ways and for different uses, and all such modifications and adaptations are included in the scope of this disclosure and the appended claims. For example, other mechanisms for substantially simultaneously operating a handle release and a flow control valve may be used, and such devices may be hand-operated, pneumatically or electrically operated, foot operated, or operated by an automatic mechanical system (such as a mechanism that changes the valve and releases the handle when the vacuum is placed in the upright position). As another example, the filter screen mechanisms provided herein may be adapted to simultaneously work with multiple vacuum filters, or on filters used in any part of a single- or multi-stage cyclone. Of course, the foregoing filter mechanism, handle release mechanisms and valve control mechanisms may be used independently from one another. For example, a handle release provided herein may be used without a valve control mechanism.

We claim:

1. A vacuum cleaner comprising:

a base having a first air inlet;

a rear housing pivotally mounted to the base;

a removable handle assembly comprising a grip, a second air inlet, and a flexible hose in fluid communication with the second air inlet;

a socket formed in the rear housing to selectively receive at least part of the removable handle assembly;

a valve assembly having a first valve inlet in fluid communication with the first air inlet, a second valve inlet in fluid communication with the flexible hose, a valve outlet in fluid communication with a vacuum fan, and a valve member adapted to move between a first valve position in which the first valve inlet is in fluid communication with the valve outlet, and a second valve position in which the second valve inlet is in fluid communication with the valve outlet;

a handle latch;

a linkage connecting the handle latch to the valve member to thereby move the valve member in synchronization with the handle latch; and wherein the handle latch has a first latch position in which it engages the removable handle assembly to hold it in connection with the socket and places the valve member in the first valve position, and a second latch position in which it releases the removable handle assembly to permit the removable handle assembly to be removed from the socket and places the valve member in the second position.

2. The vacuum cleaner of claim 1, wherein the grip is adapted for manipulating the rear housing and base on a surface to be cleaned when the removable handle assembly is held in connection with the socket.

3. The vacuum cleaner of claim 2, wherein the grip comprises the sole structure provided for manipulating the rear housing and base on a surface to be cleaned when the removable handle assembly is held in connection with the socket.

4. The vacuum cleaner of claim 1, wherein the valve member comprises a barrel valve adapted to cover the second valve inlet when the valve member is in the first valve position, and cover the first valve inlet when the valve member is in the second valve position.

5. The vacuum cleaner of claim 1, wherein the second valve inlet comprises a pivotal elbow.

6. The vacuum cleaner of claim 1, wherein valve member comprises a valve lever operatively connected to the valve member, the valve lever being rotatable about a valve pivot axis to move the valve member between the first valve position and the second valve position.

7. The vacuum cleaner of claim 6, wherein the linkage is connected at a first linkage end to the valve lever at a location remote from the valve pivot axis, and connected at a second end to the handle latch to thereby move the valve member in synchronization with the handle latch.

8. The vacuum cleaner of claim 7, wherein the handle latch is adapted to pivot about a latch pivot axis, and the linkage is connected to the handle latch at a location remote from the latch pivot axis.

9. The vacuum cleaner of claim 1, wherein the handle latch comprises one or more protrusions adapted to engage one or more corresponding structures on the removable handle assembly when the handle latch is in the first latch position.

10. The vacuum cleaner of claim 9, wherein the handle latch comprises one or more arms pivotally attached to the rear housing about a latch pivot axis that is generally perpendicular to a long axis of the rear housing, such that the handle latch rotates about the latch pivot axis between the first latch position and the second latch position.

11. The vacuum cleaner of claim 9, wherein the handle latch comprises a collar pivotally attached to the rear housing about a latch pivot axis generally that is parallel to a long axis of the rear housing, such that the handle latch rotates about the latch pivot axis between the first latch position and the second latch position.

12. The vacuum cleaner of claim 11, wherein the collar surrounds the socket and includes an opening in communication with the socket through which at least a portion of the removable handle assembly can pass.

13. The vacuum cleaner of claim 9, wherein the handle latch is mounted on one or more tracks on the rear housing such that the handle latch slides generally linearly between the first latch position and the second latch position.

14. The vacuum cleaner of claim 1, wherein the removable handle assembly comprises a wand extending from the grip, the wand comprising an extension of the second air inlet.

15. The vacuum cleaner of claim 14, wherein the wand is selectively removable from the grip.

16. The vacuum cleaner of claim 14, wherein the wand comprises a telescoping wand.

17. The vacuum cleaner of claim 1, wherein the socket is formed at an upper end of the rear housing, the removable handle assembly extends from the upper end of the rear housing when it is held in connection with the socket, the handle latch is located on a front face of the rear housing, and the rear housing further comprises a removable accessory tool positioned between the handle latch and the base, the removable accessory tool being selectively secured to the rear housing by one or more magnetics.

18. A vacuum cleaner comprising:

a base having a first air inlet;

a rear housing extending from the base;

a removable handle assembly comprising a grip, a second air inlet, and a flexible hose in fluid communication with the second air inlet;

a socket formed in the rear housing to selectively receive at least part of the removable handle assembly;

a valve assembly having a first valve inlet in fluid communication with the flexible hose, a valve outlet in fluid communication with a vacuum fan, and a valve member adapted to move between a first valve position in which the *first* valve inlet is not in fluid communication with the valve outlet, and a second valve position in which the first valve inlet is in fluid communication with the valve outlet;

a handle latch;

a linkage connecting the handle latch to the valve member to thereby move the valve member in synchronization with the handle latch; and wherein the handle latch has a first latch position in which it engages the removable handle assembly to hold it in connection with the socket and places the valve member in the first valve position, and a second latch position in which it releases the removable handle assembly to permit the removable handle assembly to be removed from the socket and places the valve member in the second position.

19. A vacuum cleaner comprising:

a base having a first air inlet;

a rear housing extending from the base;

a removable handle assembly comprising a grip, a second air inlet, and a flexible hose in fluid communication with the second air inlet;

a socket formed in the rear housing to selectively receive at least part of the removable handle assembly;

a valve assembly having a valve inlet in fluid communication with the flexible hose, a valve outlet in fluid communication with a vacuum fan, and a valve member adapted to move between a first valve position in which the valve inlet is not in fluid communication with the valve outlet, and a second valve position in which the valve inlet is in fluid communication with the valve outlet;

a handle latch having a first latch position in which it engages the removable handle assembly to hold it in connection with the socket, and a second latch position in which it releases the removable handle assembly to permit the removable handle assembly to be removed from the [sockets] *socket*;

a linkage connecting the handle latch to the valve member to thereby move the valve member in synchronization with the handle latch; and a single user interface adapted to substantially simultaneously operate the valve and the handle latch.

20. The vacuum cleaner of claim 19, wherein the single use interface comprises a manually-operable lever, slide or collar.

21. The vacuum cleaner of claim 19, wherein the single user interface comprises an electric motor adapted to substantially simultaneously operate the valve and the handle latch.

22. The vacuum cleaner of claim 21, wherein the handle latch comprises a gear tooth set formed on a side of at least a portion of the removable handle assembly.

23. A vacuum cleaner comprising:

a base having a first air inlet;

a rear housing pivotally mounted to the base;

a removable handle assembly comprising a grip, a second air inlet, and a flexible hose in fluid communication with the second air inlet;

a socket formed in the rear housing to selectively receive at least part of the removable handle assembly;

a valve assembly having a first valve inlet in fluid communication with the first air inlet, a second valve inlet in fluid communication with the flexible hose, a valve outlet in fluid communication with a vacuum fan, and a valve member adapted to move between a first valve position in which the first valve inlet is in fluid communication with the valve outlet, and a second valve position in which the second valve inlet is in fluid communication with the valve outlet;

*an air filtering device in fluid communication between the valve outlet and the vacuum fan;* a handle latch having a first latch position in which it engages the removable handle assembly to hold it in connection with the socket and places the valve member in the first valve position, and a second latch position in which it releases the removable handle assembly to permit the removable handle assembly to be removed from the socket and places the valve member in the second position; and wherein the handle latch comprises a collar pivotally attached to the rear housing about a latch pivot axis generally that is parallel to a long axis of the rear housing, such that the handle latch rotates about the latch pivot axis between the first latch position and the second latch position.

24. The vacuum cleaner of claim 23, wherein the collar surrounds the socket and includes an opening in communication with the socket through which at least a portion of the removable handle assembly can pass.

*25. The vacuum cleaner of claim 18, wherein the rear housing is pivotally mounted to the base.*

*26. The vacuum cleaner of claim 18, wherein the grip comprises the sole structure provided on the rear housing for manipulating the rear housing and base on a surface to be cleaned when the removable handle assembly is held in connection with the socket.*

*27. The vacuum cleaner of claim 18, wherein the valve member comprises a barrel valve.*

*28. The vacuum cleaner of claim 18, wherein the handle latch is mounted to pivot about a latch pivot axis, and the valve member is mounted to pivot about a valve pivot axis.*

*29. The vacuum cleaner of claim 28, wherein the linkage comprises an arm.*

*30. The vacuum cleaner of claim 18, wherein:*

*the valve assembly comprises a second valve inlet in fluid communication with the first air inlet; and*

*the valve member places the second valve inlet in fluid communication with the valve outlet when the valve member is in the first position, and blocks fluid communication between the second valve inlet and the valve outlet when the valve member is in the second position.*

*31. The vacuum cleaner of claim 1, further comprising an air filtering device in fluid communication between the valve outlet and the vacuum fan.*

*32. The vacuum cleaner of claim 18, further comprising an air filtering device in fluid communication between the valve outlet and the vacuum fan.*

* * * * *